United States Patent
Hyakudai et al.

(10) Patent No.: US 12,072,821 B2
(45) Date of Patent: Aug. 27, 2024

(54) COMMUNICATION DEVICE AND COMMUNICATION SYSTEM WITH ENCAPSULATION/DE-ENCAPSULATION OF DATA AND COMMANDS

(71) Applicant: Sony Semiconductor Solutions Corporation, Kanagawa (JP)

(72) Inventors: Toshihisa Hyakudai, San Diego, CA (US); Junya Yamada, Kanagawa (JP)

(73) Assignee: Sony Semiconductor Solutions Corporation, Kangawa (JP)

( * ) Notice: Subject to any disclaimer, the term of this patent is extended or adjusted under 35 U.S.C. 154(b) by 0 days.

(21) Appl. No.: 17/740,865

(22) Filed: May 10, 2022

(65) Prior Publication Data
US 2022/0374376 A1  Nov. 24, 2022

Related U.S. Application Data

(60) Provisional application No. 63/190,451, filed on May 19, 2021.

(51) Int. Cl.
   *G06F 13/362*  (2006.01)
   *H04L 69/08*   (2022.01)

(52) U.S. Cl.
   CPC ............ *G06F 13/362* (2013.01); *H04L 69/08* (2013.01)

(58) Field of Classification Search
   CPC ............................. G06F 13/362; H04L 69/08
   USPC ............................. 710/8, 20, 30, 64, 105, 110
   See application file for complete search history.

(56) References Cited

U.S. PATENT DOCUMENTS

| | | | | |
|---|---|---|---|---|
| 6,272,551 B1* | 8/2001 | Martin | .................. | G06F 13/385 709/236 |
| 7,917,682 B2* | 3/2011 | Bakthavathsalam | ........................ | G06F 3/0661 710/315 |
| 2002/0181476 A1* | 12/2002 | Badamo | .................. | H04L 63/08 370/352 |
| 2005/0058127 A1* | 3/2005 | Munter | ............... | H04L 49/1553 370/380 |
| 2014/0122753 A1* | 5/2014 | Chiu | ..................... | G06F 3/0604 710/74 |
| 2015/0120975 A1* | 4/2015 | Sengoku | ................. | G06F 13/40 710/110 |
| 2017/0142598 A1* | 5/2017 | Fang | ..................... | H04W 16/26 |

FOREIGN PATENT DOCUMENTS

JP  2011-239011 A  11/2011

* cited by examiner

*Primary Examiner* — Idriss N Alrobaye
*Assistant Examiner* — Henry W Yu
(74) *Attorney, Agent, or Firm* — Michael Best & Friedrich LLP

(57) ABSTRACT

A communication device includes a communication interface unit configured to receive control data from a master, the control data including data in a predetermined transmission format of a first protocol to be transmitted from a communication partner device to a slave, a storage unit configured to store the data of the first protocol received by the communication interface unit, an encapsulator configured to convert the data of the first protocol stored in the storage unit into data of a second protocol, and a communication unit configured to transmit the data of the second protocol converted by the encapsulator to the communication partner device.

16 Claims, 21 Drawing Sheets

COMMUNICATION DEVICE AND COMMUNICATION SYSTEM WITH ENCAPSULATION/DE-ENCAPSULATION OF DATA AND COMMANDS

CROSS REFERENCE TO RELATED APPLICATIONS

This application claims the benefit of U.S. Priority Patent Application 63/190,451 filed on May 19, 2021, the entire contents of which are incorporated herein by reference.

TECHNICAL FIELD

The present disclosure relates to a communication device and a communication system.

BACKGROUND ART

A technique is used for performing high-speed serial communication using a SerDes (Patent Literature 1). The SerDes is used in various fields of art, including communication between in-vehicle units.

CITATION LIST

Patent Literature

[PTL 1]
  JP 2011-239011A

SUMMARY

Technical Problem

The progress of automated driving technology increases the need for high-speed communication between in-vehicle units. The Automotive SerDes Alliance (ASA) is establishing standardization of high-speed serial communication between a master SerDes and a slave SerDes, but no standardization of communication between a master SerDes and a master device and between a slave SerDes and a slave device.

In one example, for the slave device is used as an image sensor, the inter-integrated circuit (I2C) communication is often performed between the slave device and the slave SerDes. However, the existing I2C communication has a low transmission rate, so even if high-speed serial communication is performed between a master SerDes and a slave SerDes, the I2C communication performed between the slave device and a slave SerDes makes high-speed data transmission fail to be performed between the master device and the slave device.

Thus, it is desirable to provide a communication device and communication system capable of performing data transmission between master and slave devices at high speed, even in the case of employing a low-speed communication protocol at some points in the middle of a communication channel between the master and slave devices.

Solution to Problem

According to an embodiment of the present disclosure, there is provided a communication device including:
  a communication interface unit configured to receive control data from a master, the control data including data in a predetermined transmission format of a first protocol to be transmitted from a communication partner device to a slave;
  a storage unit configured to store the data of the first protocol received by the communication interface unit;
  an encapsulator configured to convert the data of the first protocol stored in the storage unit into data of a second protocol; and
  a communication unit configured to transmit the data of the second protocol converted by the encapsulator to the communication partner device.

The predetermined transmission format may be a format for receiving an ACK signal or a NACK signal from the communication partner device after completing transmission of a plurality of bytes of data to the communication partner device.

The predetermined transmission format of the first protocol may be an I2C bulk mode format specified by Automotive SerDes Alliance (ASA) standard ver1.01.

The storage unit may store the control data including identification information of the encapsulator, a number of data, and information regarding the I2C bulk mode format.

The communication interface unit may have a data transmission rate faster than a data transmission rate between the communication partner device and the slave. The communication device may further include a de-encapsulator configured to convert the data of the second protocol received by the communication unit from the communication partner device into the data of the first protocol and store converted data in the storage unit. According to another embodiment of the present disclosure, there is provided a communication system including:
  a first communication device configured to perform data communication of a first protocol with a master; and a second communication device configured to perform data communication of a second protocol with the first communication device and perform the data communication of the first protocol with a slave,
  in which the first communication device has
  a first communication interface unit configured to receive control data from the master, the control data including data in a predetermined transmission format of the first protocol to be transmitted from the second communication device to the slave,
  a first storage unit configured to store the data of the first protocol received by the first communication interface unit,
  a first encapsulator configured to convert the data of the first protocol stored in the first storage unit into data of a second protocol, and a first communication unit configured to transmit the data of the second protocol converted by the first encapsulator to the second communication device.

The communication system may further include a first de-encapsulator configured to convert the data of the second protocol transmitted from the second communication device and received by the first communication unit into the data of the first protocol and store converted data in the first storage unit.

The predetermined transmission format of the first protocol may be an I2C bulk mode format specified by ASA standard ver1.01.

The first communication interface unit may have a data transmission rate faster than a data transmission rate between the second communication device and the slave.

The second communication device may have, a second communication unit configured to receive the data of the second protocol transmitted from the first communication device,
    a second de-encapsulator configured to convert the data of the second protocol received by the second communication unit into the data of the first protocol, and
    a second communication interface unit configured to transmit the data of the first protocol converted by the second de-encapsulator to the slave.

The second communication device may have a second encapsulator configured to convert the data of the first protocol transmitted from the slave and received by the second communication interface unit into the data of the second protocol, and
    the second communication unit transmits the data of the second protocol converted by the second encapsulator to the first communication device.

The master may have,
    a second storage unit configured to store the control data including the data of the first protocol to be transmitted from the second communication device to the slave, and
    a third communication interface unit configured to transmit the control data stored in the second storage unit to the first communication device.

The communication system may further include:
an internal slave incorporated in the second communication device and configured to be directly controlled by the master,
in which the second communication device has a third storage unit configured to store data for the master to directly control the internal slave.

The third storage unit may store the data of the first protocol to be transmitted to the slave.

The first communication device may have,
    a third encapsulator configured to convert the data given from the master and stored in the first storage unit into the data of the second protocol, and
    a third de-encapsulator configured to convert a protocol of data of the internal slave that is received by the first communication unit and read out from the third storage unit, and
the second communication device may store data output from the third encapsulator in the third storage unit. According to still another embodiment of the present disclosure, there is provided a communication method including:
receiving, by a communication interface unit, control data from a master, the control data including data in a predetermined transmission format of a first protocol to be transmitted from a communication partner device to a slave;
storing the data of the first protocol received by the communication interface unit in a storage unit;
converting the data of the first protocol stored in the storage unit into data of a second protocol; and
transmitting the converted data of the second protocol to the communication partner device.

DESCRIPTION OF EMBODIMENTS

Embodiments of a communication device and a communication system are now described with reference to the drawings. The key constitutional components of the communication device and the communication system are now mainly described, but the communication device and the communication system can have other components and functions than illustrated or described. The description herein is not intended to exclude components or functions not illustrated or described.

(Fundamental Configuration of Communication System)

Figure 1:
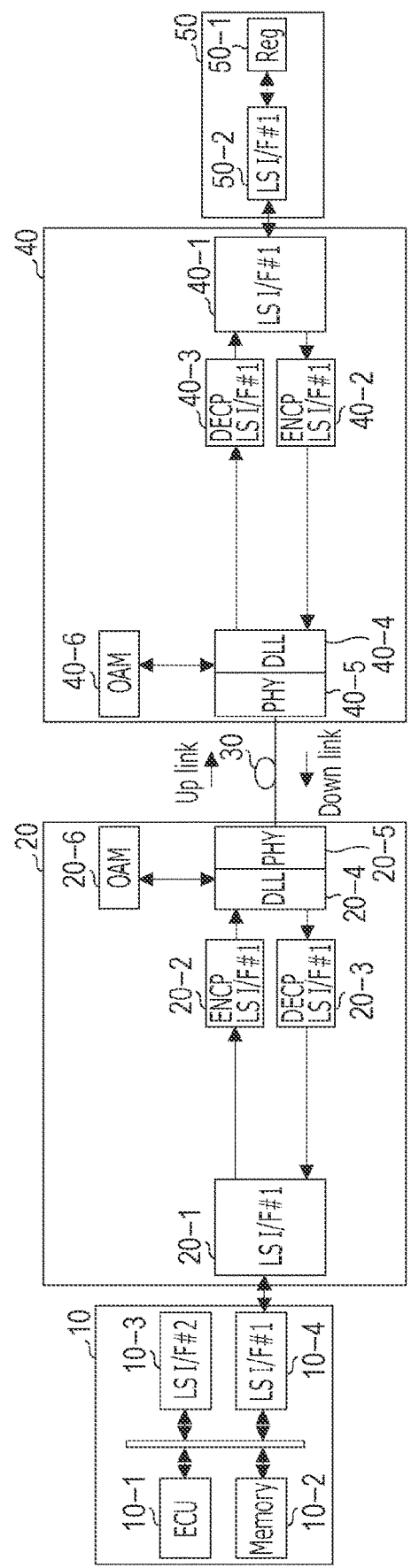
FIG. 1 is a block diagram illustrating a fundamental configuration that is the basis of a communication system according to an embodiment of the present disclosure.

FIG. 1 is a block diagram illustrating a fundamental configuration that is the basis of a communication system 1 according to an embodiment of the present disclosure.

The communication system 1 illustrated in FIG. 1 constitutes part of advanced driver-assistance systems (ADAS).

In FIG. 1, the communication system 1 includes a master SerDes 20, a slave SerDes 40, a master device 10, and a slave device 50.

The master SerDes 20 and the slave SerDes 40 perform high-speed serial communication in accordance with, for example, a predetermined communication standard (a second protocol). An example of the predetermined communication standard includes FPD-Link, A-phy, ASA, or the like. The description herein is given mainly of an example in which the master device 10 and the master SerDes 20 perform high-speed serial communication in compliance with ASA, which is the high-speed interface standard.

The master SerDes 20 herein can be called a communication device, a first communication device, or SerDes #1 20. The slave SerDes 40 herein can be called a second communication device or SerDes #2 40.

The data transmission is performed between the SerDes #1 20 and the master device 10. The description is herein mainly given of an example of the master device 10 used as an ECU 10 for vehicle control. The ECU 10 controls the entire communication system 1 illustrated in FIG. 1. The ECU 10 and the SerDes #1 20 perform serial communication with each other using a communication protocol having relatively low speed, such as I2C and a GPIO.

The ECU 10 includes an ECU core 10-1, a memory 10-2, a first low-speed interface unit (LS I/F #1) 10-4, and a second low-speed interface unit (LS I/F #2) 10-3. The memory 10-2 previously stores a register setting value for the ECU 10 to set the operation of the slave device 50.

The description is now mainly given of an example of the slave device 50 used as a sensor 50 (e.g., an image sensor), but the slave device 50 can have any type. The register setting value stored in the memory 10-2 of the ECU 10 is set in a control register of the sensor 50 via the SerDes #1 20 and the SerDes #2 40 upon turning the power on. This configuration makes it possible for the ECU 10 to control the operation of the sensor 50 using the register setting value stored in the memory 10-2. The SerDes #1 20 has a low-speed interface unit (LS I/F #1) 20-1, an encapsulator (ENCP LS I/F #1) 20-2, and a de-encapsulator (DECP LS I/F #2) 20-3, an operation-administration-maintenance (OAM) unit 20-6, a DLL 20-4, and a PHY 20-5.

The SerDes #2 40 has a PHY 40-5, a DLL 40-4, an OAM unit 40-6, a de-encapsulator (DECP LS I/F #1) 40-3, a low-speed interface unit (LS I/F #1) 40-1, and an encapsulator (ENCP LS I/F #2) 40-2.

The sensor 50, which is the slave device 50, has a low-speed interface unit (LS I/F #1) 50-2 and a register 50-1. The sensor 50 has an I2C communication function. The ASA standard ver1.01 provides that the I2C is used as a low-speed communication protocol and describes a technique for converting an I2C signal format into the ASA standard communication protocol. The processing for converting the I2C communication protocol into the ASA communication protocol is performed by the ENCP LS I/F #1 20-2 in the SerDes #1 20 and the ENCP LS I/F #1 40-2 in the SerDes #2 40.

In the SerDes #1 20, the LS I/F #1 20-1 performs serial communication with the LS I/F #1 10-4 in the ECU 10 using a predetermined protocol (e.g., I2C). The ENCP LS I/F #1 20-2 of the SerDes #1 20 converts data received through the LS I/F #1 20-1 into the ASA-compliant protocol to generate a packet. The DLL 20-4 combines the packet given from the ENCP LS I/F #1 20-2 with other transmission packets (including the OAM unit 20-6) to generate an uplink packet and transfer it to the PHY 20-5. The PHY 20-5 outputs the uplink packet to a cable 30 in accordance with an uplink output timing based on time-division duplex (TDD).

The uplink packet transmitted from the SerDes #1 20 is transferred to the DLL 40-4 via the PHY 40-5 in the SerDes #2 40. The DLL 40-4 picks out a packet to be used for the sensor 50 from the uplink packet and transmits it to the DECP LS I/F #1 40-3. The DECP LS I/F #1 40-3 converts the protocol of the packet to be used for the sensor 50 into another and transmits the protocol-converted data for I2C to the LS I/F #1 40-1. The LS I/F #1 40-1 transmits the data given from the DECP LS I/F #1 40-3 to the sensor 50.

The data transmitted from the ECU 10 is stored in the register 50-1 of the sensor 50 via the SerDes #1 20 and the SerDes #2 40.

The sensor 50, when receiving the data from the ECU 10, transmits data as a response to the received data to the SerDes #2 40 using, for example, I2C communication. In the SerDes #2 40, the LS I/F #1 40-1 transmits the received data to the ENCP LS I/F #1 40-2. The ENCP LS #1 40-2 converts the protocol of the received data into the ASA-compliant protocol to generate a packet. The DLL 40-4 generates a downlink packet that includes the packet given from the ENCP LS #1 40-2. The downlink packet is transmitted to the SerDes #1 20 via the PHY 40-5.

In the SerDes #1 20, the PHY 20-5, when receiving the downlink packet, transfers it to the DLL 20-4. The DLL 20-4 de-assembles the downlink packet and transmits a resulting packet for the ECU 10 to the DECP LS I/F #1 20-3. The DECP LS I/F #1 20-3 converts the protocol of the packet for the ECU 10 to generate, for example, data for I2C and transmits the generated data to the LS I/F #1 20-1. In the ECU 10, the LS I/F #1 10-4 receives the data from the LS I/F #1 20-1 of the SerDes #1 20 using I2C communication and stores the received data in the memory 10-2.

Figure 2:
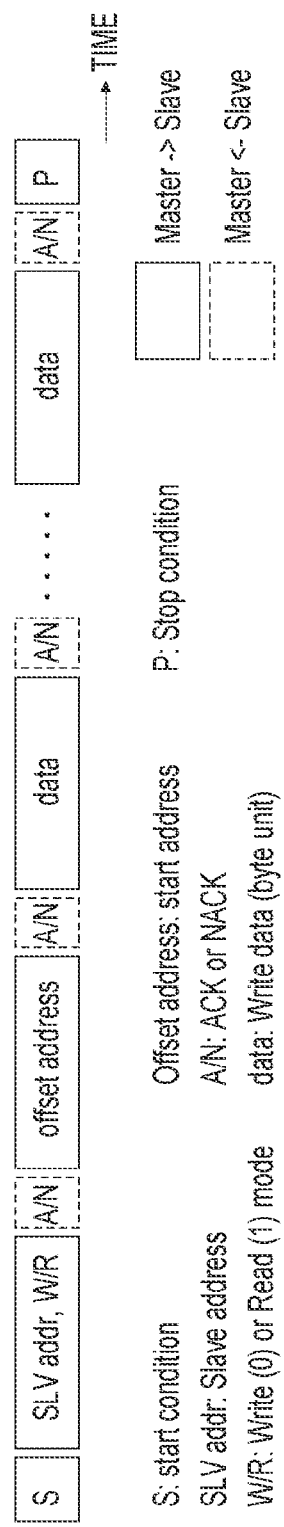
FIG. 2 is a diagram illustrating a typical write sequence for I2C.

FIG. 2 is a diagram illustrating a typical write sequence for I2C. The ECU 10 that performs I2C communication issues a start condition (S) and then issues a slave address (7 bits) indicating a communication partner of I2C and one bit indicating a write/read (W/R) operation. In response to this operation, the sensor 50 for I2C, which is the I2C communication partner pointed by the slave address, sends an acknowledgment ACK as a reply. The ECU 10, when receiving the ACK from the sensor 50 that performs I2C communication, issues an offset address (in bytes) indicating an address of the register 50-1 of the sensor 50 to which data is to be written in the write mode. In response to this issuance, the sensor 50 sends an acknowledgment ACK as a reply. Then, the ECU 10 issues write data in bytes. The sensor 50 sends an acknowledgment ACK as a reply every time data is received in bytes. The ECU 10 and the sensor 50 repeat the data writing operation until the intended number of data are written. Upon completing the data writing, the ECU 10 issues a stop condition (P) to end the I2C communication. The operations described above are performed in FIG. 1 between the LS I/F #1 10-4 of the ECU 10 and the LS I/F #1 20-1 of the SerDes #1 20 and between the LS I/F #1 40-1 of the SerDes #2 40 and the LS I/F #1 50-2 of the slave device (the sensor) 50.

The ASA standard defines, in transferring the I2C data to and from the SerDes 20 or 40, the transfer mode of not only an I2C byte mode that transfers data byte by byte like normal I2C but also an I2C bulk mode that transfers multiple data together. In the I2C bulk mode, the ECU 10 does not receive the ACK/NACK signal from the sensor 50 for each byte, but sends the ACK/NACK signal to the sensor 50 collectively for plurality of bytes and receives the ACK/NACK signal from the sensor 50 in a batch manner, which enables data to be transmitted to and from the sensor 50. Thus, it is possible to improve the data transmission rate significantly.

Figure 3:
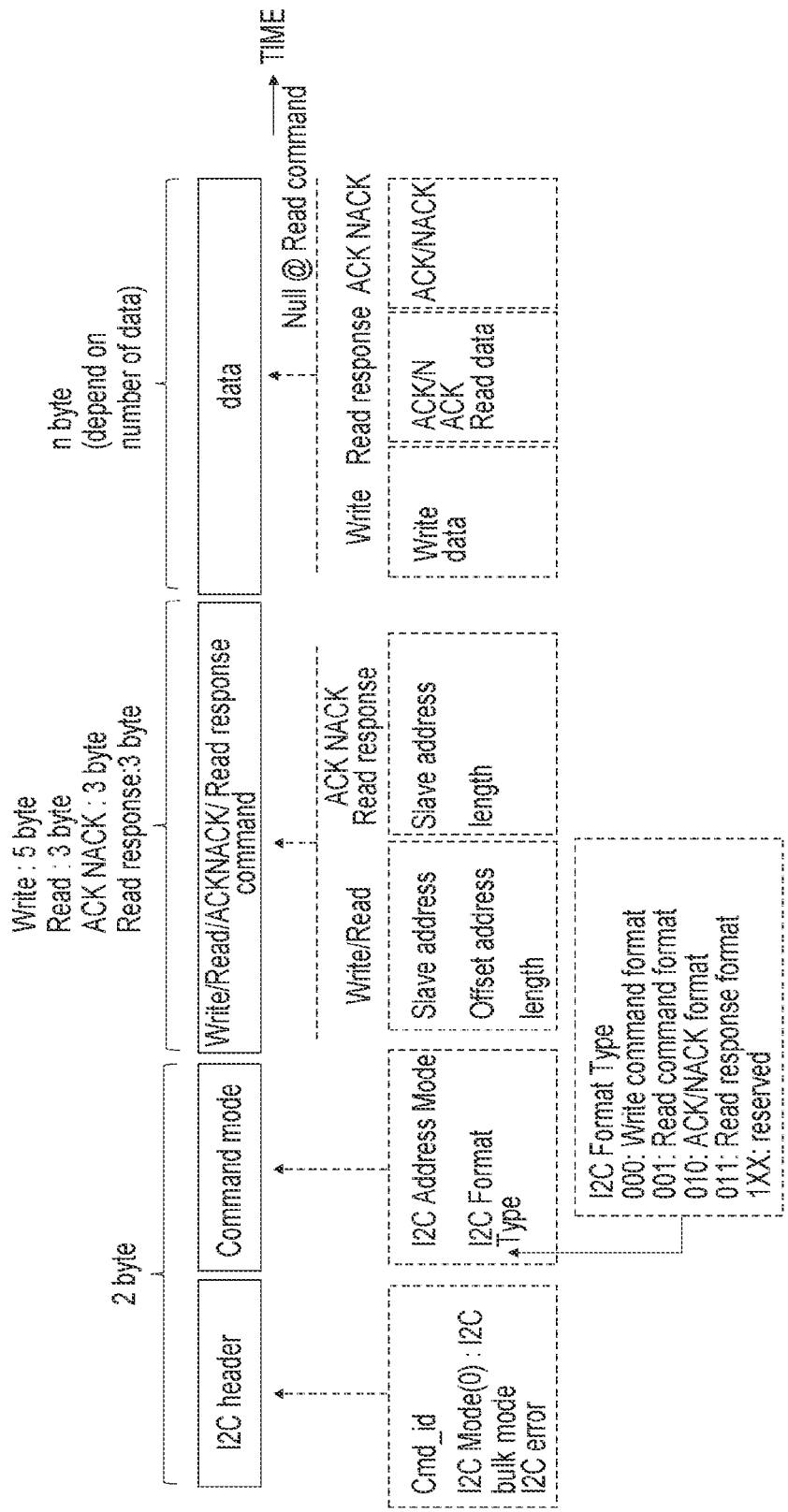
FIG. 3 is a diagram illustrating an I2C bulk mode format.

FIG. 3 is a diagram illustrating an I2C bulk mode format. The I2C bulk mode format includes I2C header, command mode, write/read or ACK/NACK or read-response command, and data areas.

The I2C header includes parameters of cmd_id indicating a command ID, I2C mode indicating the transfer mode (I2C bulk mode or I2C byte mode), and I2C error indicating the I2C bus error status.

The command mode includes an I2C address mode and an I2C format type. The I2C address mode indicates whether or not to specify the offset address of a write register. The I2C format type indicates whether the command to be transmitted is write or read, ACK or NACK reply, and readout data (a read response) for the read command. The write/read or ACK/NACK or read-response command is different in its content depending on a command selected among the I2C format types. For a write or read command, the content of the command includes an I2C slave address to be written, an offset address, and the number of bytes of write or read data. For an ACK/NACK or read-response command, the content of the command includes a slave address indicated by the write/read command and the number of bytes of data received from the slave device. The data of the format includes write data, read data, or ACK/NACK data for each command.

The description is now given of the operation in the case where the ECU 10 transmits data to the sensor 50 in the I2C bulk mode in the communication system 1 illustrated in FIG. 1.

Figure 4:
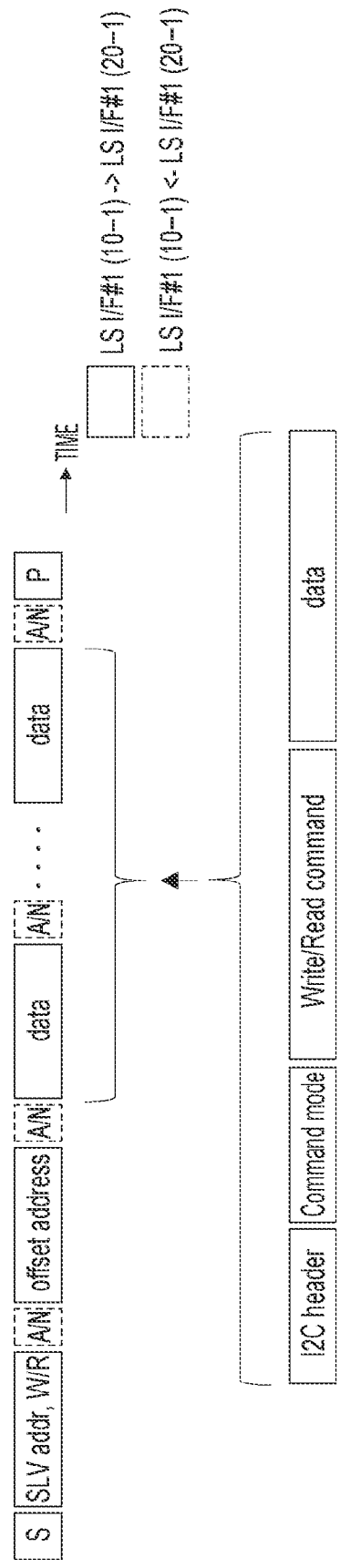
FIG. 4 is a diagram illustrating a data configuration in the I2C bulk mode format.

The ECU 10 intends to transmit control data for controlling the sensor 50 to the register 50-1 in the I2C bulk mode. Thus, the ECU core 10-1 controls the LS I/F #1 10-4 that performs I2C communication to initiate I2C communication with the SerDes #1 20. The LS I/F #1 10-4 outputs the slave address and offset address of the SerDes #1 20 in accordance with an I2C write sequence. Then, the ECU core 10-1 generates a write command that includes the I2C slave address of the sensor 50, the offset address, and the write data in accordance with the I2C bulk mode format illustrated in FIG. 3. The ECU core 10-1 sequentially places the generated write command in the data area of the I2C write sequence in bytes and transmits it to the LS I/F #1 20-1 of the SerDes #1 20. FIG. 4 is a diagram illustrating the configuration of data in the I2C bulk mode format in which the ECU 10 performs transmission to the SerDes #1 20 using the normal I2C writing procedure. The I2C bulk mode format includes the data area ("data") following the slave and offset addresses. The data area ("data") includes an I2C header, a command mode, a write/read command, and data.

In the SerDes #1 20, the LS I/F #1 20-1 outputs the received I2C data sequentially to the ECNP LS I/F #1 20-2. The ECNP LS I/F #1 20-2 is capable of interpreting the mode information in the I2C header to recognize that the format of the received data is the I2C bulk mode. In a case where the I2C bulk mode is described in the I2C header, the subsequent data is processed by regarding them as the I2C bulk mode. After receiving all data in the I2C bulk mode, the SerDes #1 20 collects them as the I2C bulk mode format illustrated in FIG. 3 and stores them in a packet payload in a packet format.

Figure 5:
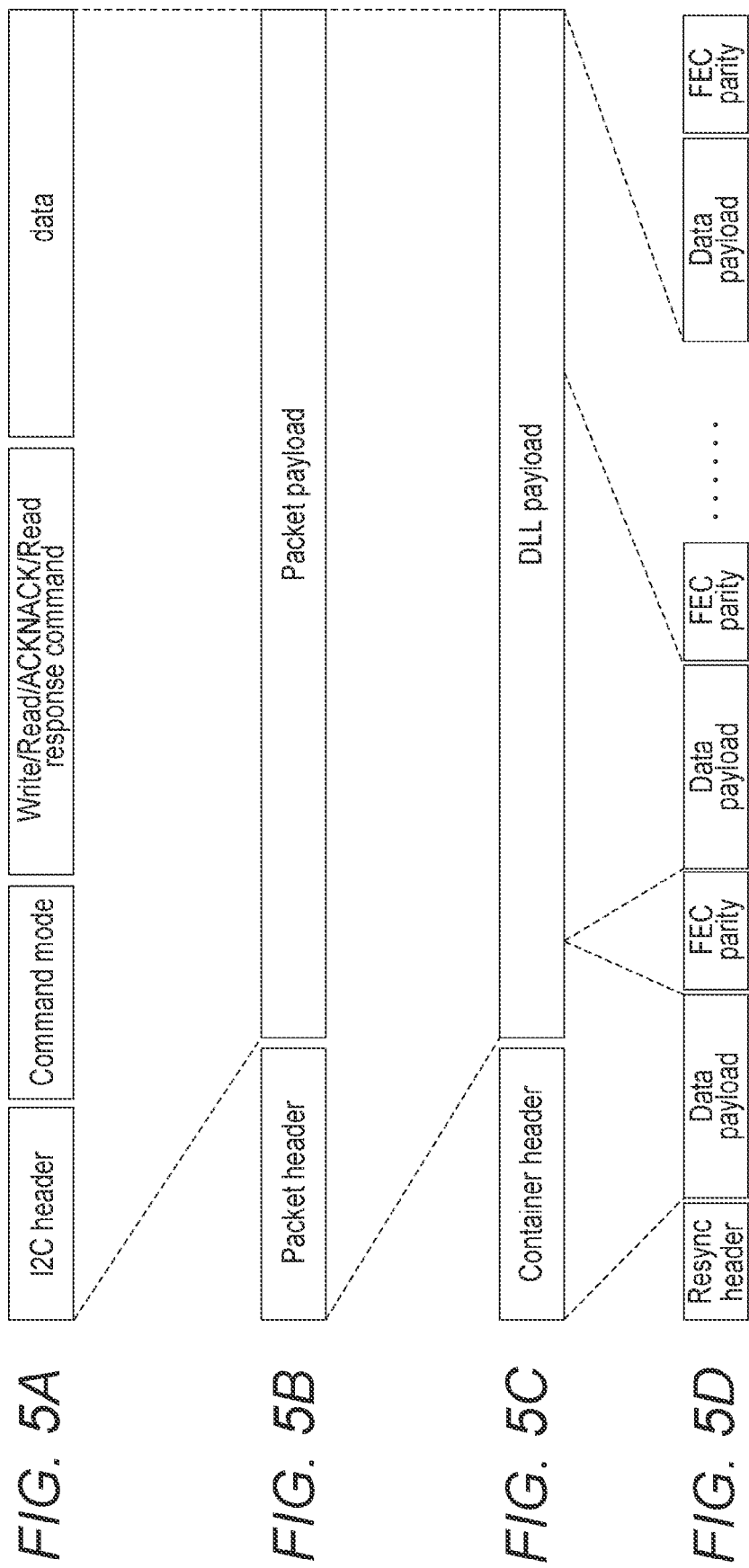
FIGS. 5A to 5D are diagrams illustrating the configuration of data and packet generated in each component in a SerDes #1.

FIGS. 5A to 5D are diagrams illustrating the configuration of data and packet generated in each component in a SerDes #1 20. FIG. 5A is a view illustrating the I2C bulk mode format, FIG. 5B is a view illustrating a packet format generated by the ENCP LS I/F #1 20-2, and FIG. 5C is a view illustrating a link-layer container format generated by the DLL 20-4, and FIG. 5D is a view illustrating a PHY format generated by the PHY 20-5.

As illustrated in FIG. 5B, the ENCP LS I/F #1 20-2 generates a packet format having a packet header indicating a packet type or the like and a packet payload including an I2C bulk mode format.

The ENCP LS I/F #1 20-2 outputs the packet format to the DLL 20-4. The DLL 20-4 generates a link-layer container format on the basis of the received packet format illustrated in FIG. 5B.

As illustrated in FIG. 5C, the link-layer container format has a container header and a DLL payload. The container header includes packet output destination information and the like. The DLL payload includes the link-layer container format of FIG. 5B.

The DLL 20-4 further generates the link-layer container format (FIG. 5C) in which an OAM packet including a system control register or the like is stored in the packet payload and outputs the link-layer container format (FIG. 5C) to the PHY 20-5.

The PHY 20-5 converts the link-layer container format (FIG. 5C) into the PHY format (FIG. 5D) in accordance with the ASA standard. Furthermore, the PHY 20-5 outputs the PHY format (FIG. 5D) to the SerDes #2 40 via the cable 30 over the uplink.

In the SerDes #2 40, the PHY 40-5 picks out the link-layer container format (FIG. 5C) from the received PHY format (FIG. 5D) and outputs it to the DLL 40-4.

The DLL 40-4 interprets the container header of the link-layer container format (FIG. 5C) and recognizes that the data to be output to the DECP LS I/F #1 40-3 is stored in the DLL payload. Accordingly, the DLL 40-4 outputs the DLL payload (FIG. 5C) to the DECP LS I/F #1 40-3.

The DECP LS I/F #1 40-3 interprets the packet payload (FIG. 5B) and recognizes that the I2C bulk mode is transferred by means of the I2C header (FIG. 3). The DECP LS I/F #1 40-3 further interprets the command mode (FIG. 3) and recognizes that the command is a write command. Then, the DECP LS I/F #1 40-3 further interprets the write command (FIG. 3) and recognizes an I2C slave address of an I2C communication destination, an offset address of the register, and a data length. Thus, this configuration makes it possible for the DECP LS I/F #1 40-3 to recognize all the write data correctly.

The DECP LS I/F #1 40-3 controls the LS I/F #1 40-1 on the basis of the obtained information to initiate I2C communication with the sensor 50. The I2C communication is the write sequence, so the I2C format illustrated in FIG. 2 is used.

The LS I/F #1 40-1 performs I2C communication with the LS I/F #1 50-2 of the sensor 50 to transfer data sequentially.

In the sensor 50, the LS I/F #1 50-2 writes the received data sequentially to the register 50-1. At the same time, the LS I/F #1 50-2 sends, as a reply, an ACK signal indicating that the data is received unmistakably for each byte to the LS I/F #1 40-1 (FIG. 2).

In the SerDes #2 40, the ENCP LS I/F #1 40-2 stores the ACK signal replied from the LS I/F #1 50-2 of the sensor 50 over the I2C communication between them. If the I2C communication is completed, the ENCP LS I/F #1 40-2 generates an ACK/NACK command in the I2C bulk mode (FIG. 3), stores all the ACK/NACK signals in the data, and outputs them to the DLL 40-4 as the packet format (FIG. 5B).

The DLL 40-4 stores the packet format in the payload of the link-layer container format and outputs the link-layer container format (FIG. 5C) to the PHY 40-5. The DLL 40-4 also generates a link-layer container format (FIG. 5C) in which the OAM packet is stored and outputs it to the PHY 40-5.

The PHY 40-5 converts the link-layer container format (FIG. 5C) into the PHY format (FIG. 5D). The PHY 40-5 outputs the PHY format (FIG. 5D) to the SerDes #1 20 over the downlink. In the SerDes #1 20, the PHY 20-5 receives the PHY format (FIG. 5D), picks out the link-layer container format (FIG. 5C) from the data payload, and outputs it to the DLL 20-4.

The DLL 20-4 interprets the container header (FIG. 5C) and accordingly outputs the DLL payload to the DECP I/F #1 20-3.

The DECP I/F #1 20-3 interprets the I2C header of the I2C header (FIG. 5A) and the command mode and recognizes that it is the ACK/NACK command. Then, all the ACK/NACK data at the time of I2C communication with the sensor 50 is acquired in the data area (FIG. 5A, FIG. 3).

If the I2C communication for writing the register data to the sensor 50 via the SerDes #1 20 and the SerDes #2 40 is completed and then the appropriate time has passed, the ECU 10 reads out the ACK/NACK data held by the DECP LS I/F #1 20-3 to check that the data is written correctly using the I2C communication between the LS I/F #1 10-4 and the LS I/F #1 20-1, so recognizing whether the register setting for the sensor 50 is performed unmistakably.

The operations described above allow the ECU 10 to perform the register setting to control the operation of the sensor 50. The I2C bulk mode eliminates the need to exchange the ACK/NACK signal to indicate that the reception of each byte of data is completed between the SerDes #1 20 and the SerDes #2 40. Thus, although the transmission rate of I2C data can be improved, the connection is established using a low-speed I2C between the ECU 10 and the SerDes #1 20 and between the SerDes #2 40 and the sensor 50, so the I2C communication can be the cause of the transmission rate bottleneck.

In one example, the change of the interface between the ECU 10 and the SerDes #1 20 into an interface such as serial peripheral interface (SPI) that is faster than I2C makes it possible to solve the bottleneck on the data transmission rate. However, in a typical image sensor 50, the I2C is often used as a control interface. In addition, in a camera module to which the image sensor 50, a temperature sensor, a power supply IC, and the like are connected, these devices are connected by an I2C bus and the control is typically performed by the I2C from the ECU 10 side via the image sensor 50. Thus, in the case of changing the control interface on the ECU 10 side into a high-speed interface such as SPI, the control interfaces on the ECU 10 side and the sensor 50 side are made different, so how to handle the compatibility between them is a challenge.

The communication device and the communication system 1 according to an embodiment of the present disclosure described below have the configuration capable of transmitting control data at high speed between the sensor 50 and the ECU 10. In this case, the sensor 50 uses the control data of the I2C transmission method specified in the ASA standard ver1.01, and the ECU 10 transmits the control data to the sensor 50 using an I/F faster than the I2C.

First Embodiment

Figure 6:
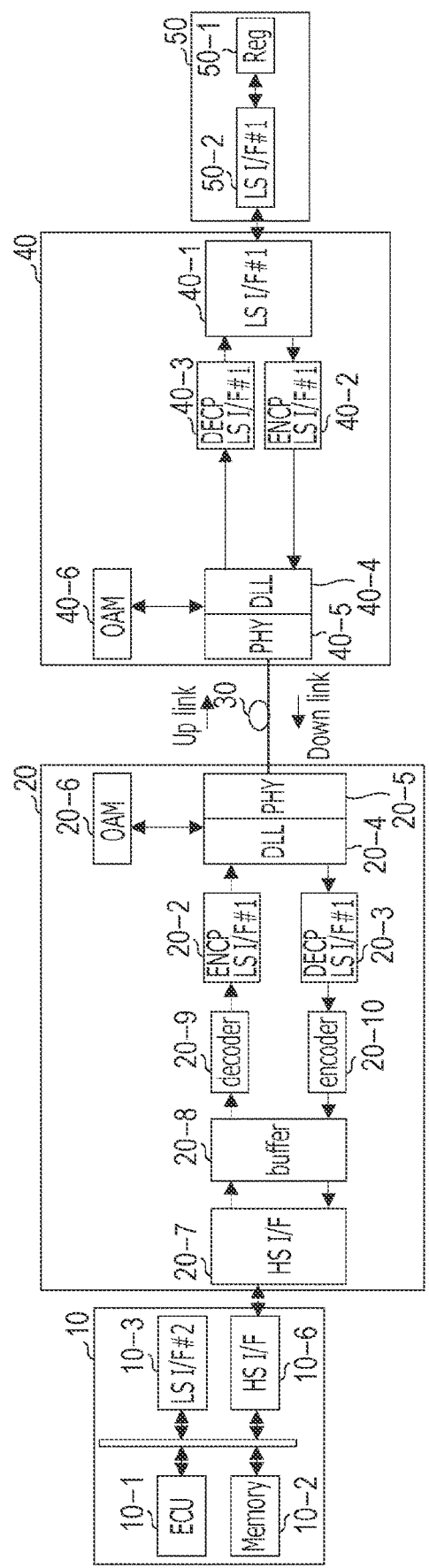
FIG. 6 is a block diagram illustrating a schematic configuration of a communication system provided with a communication device according to a first embodiment.

FIG. 6 is a block diagram illustrating a schematic configuration of the communication system 1 provided with a communication device according to a first embodiment. In FIG. 6, the same reference numerals are given to the components common to those illustrated in FIG. 1, and the differences are mainly described below.

In FIG. 6, the ECU 10 is provided with an HS I/F 10-6 of a faster signal protocol instead of the low-speed LS I/F #1 10-4.

Similarly, the SerDes #1 20 is provided, instead of the LS IF #1 20-1, with a high-speed interface HS I/F 20-7, which is the same type as the LS I/F #1 20-1 and is used to be connected to the HS I/F 10-6. In addition, the SerDes #1 20 is provided with a buffer memory 20-8, a decoder 20-9, and an encoder 20-10. The buffer memory 20-8 temporarily holds data transmitted or received to or from the HS I/F 20-7. The decoder 20-9 processes the data received by the HS I/F 20-7. The encoder 20-10 processes the data to be transmitted to the HS I/F 20-7. The buffer memory 20-8 can be referred to hereinafter as a buffer memory 20-8.

The SerDes #1 20 has a communication interface that receives control data from the ECU 10. This control data includes data in a predetermined transmission format of the first protocol (e.g., an I2C communication protocol) transmitted from the SerDes #2 40 to the sensor 50. The predetermined transmission format is, for example, the I2C bulk mode format. This communication interface is an interface capable of transmitting data at a higher speed than a normal I2C communication interface.

In the SerDes #1 20, the ENCP LS I/F #1 20-2 and the DECP LS I/F #1 20-3 have their respective preset IDs, which are information recognized by the ECU 10 in advance. The description is now given of an example in which the ID of the ENCP LS I/F #1 is "ENCP LS I/F #1" itself.

The ECU 10 uses the I2C bulk mode specified in the ASA standard ver1.01 to perform processing for writing the control data to the register 50-1 of the sensor 50 via the SerDes #1 20 and the SerDes #2 40.

Figure 7A:
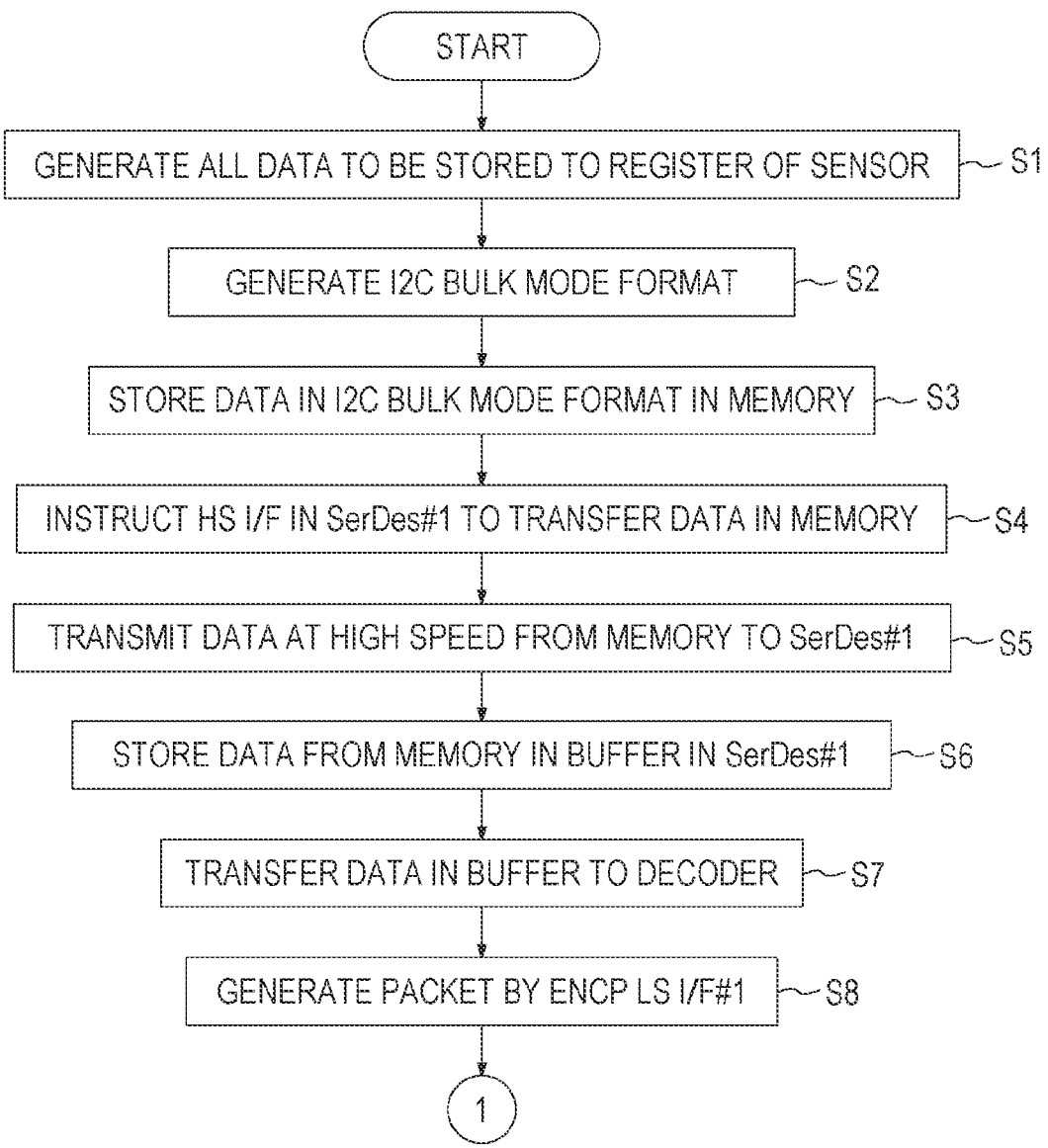
FIG. 7A is a flowchart illustrating a processing procedure performed in the communication system of FIG. 6.
Figure 7B:
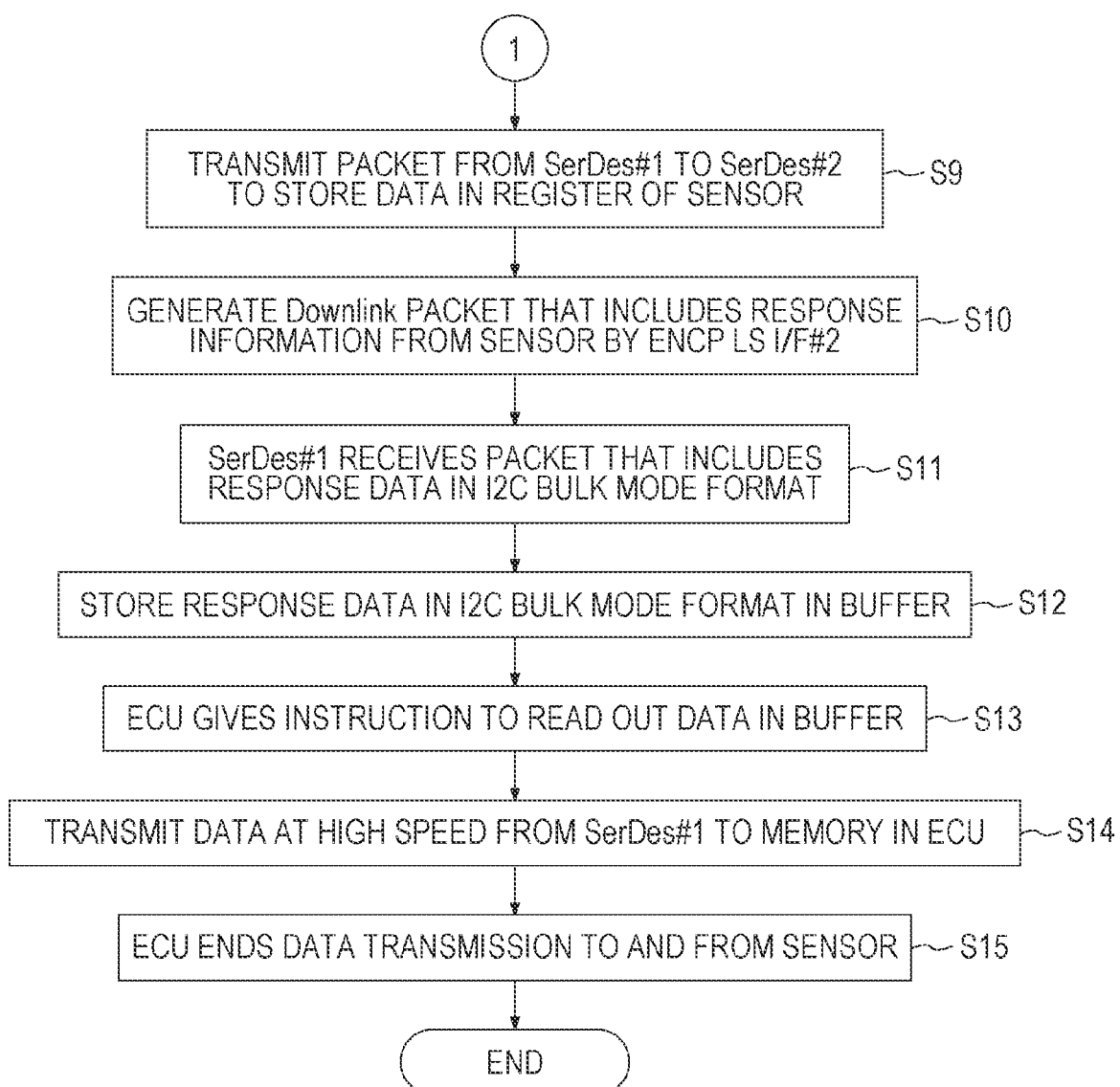
FIG. 7B is a flowchart illustrating a continuation of the flowchart of FIG. 7A.
Figure 8:
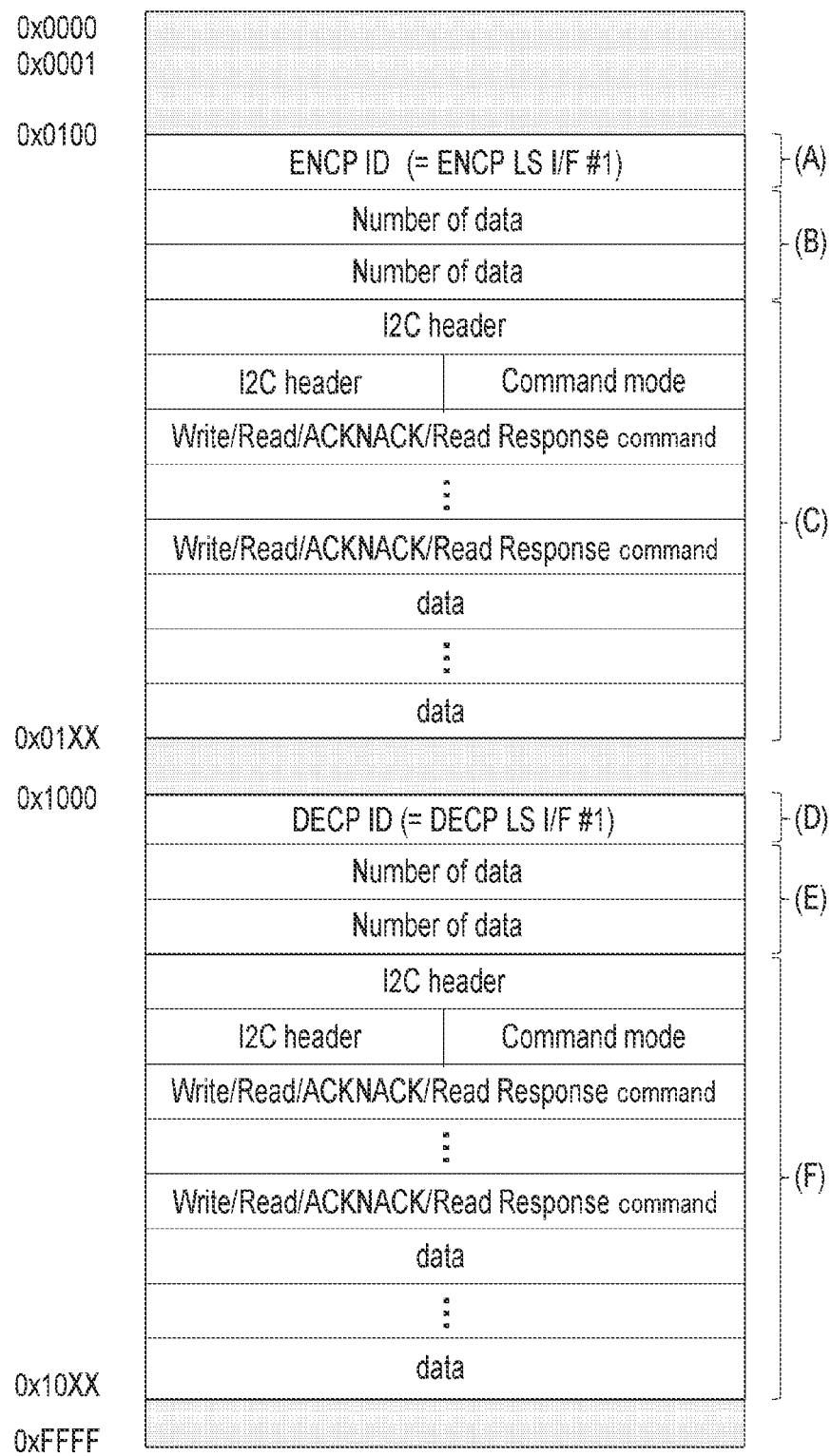
FIG. 8 is a diagram illustrating a memory map configuration in a case of storing data with an I2C bulk mode format in a memory.
Figure 9:
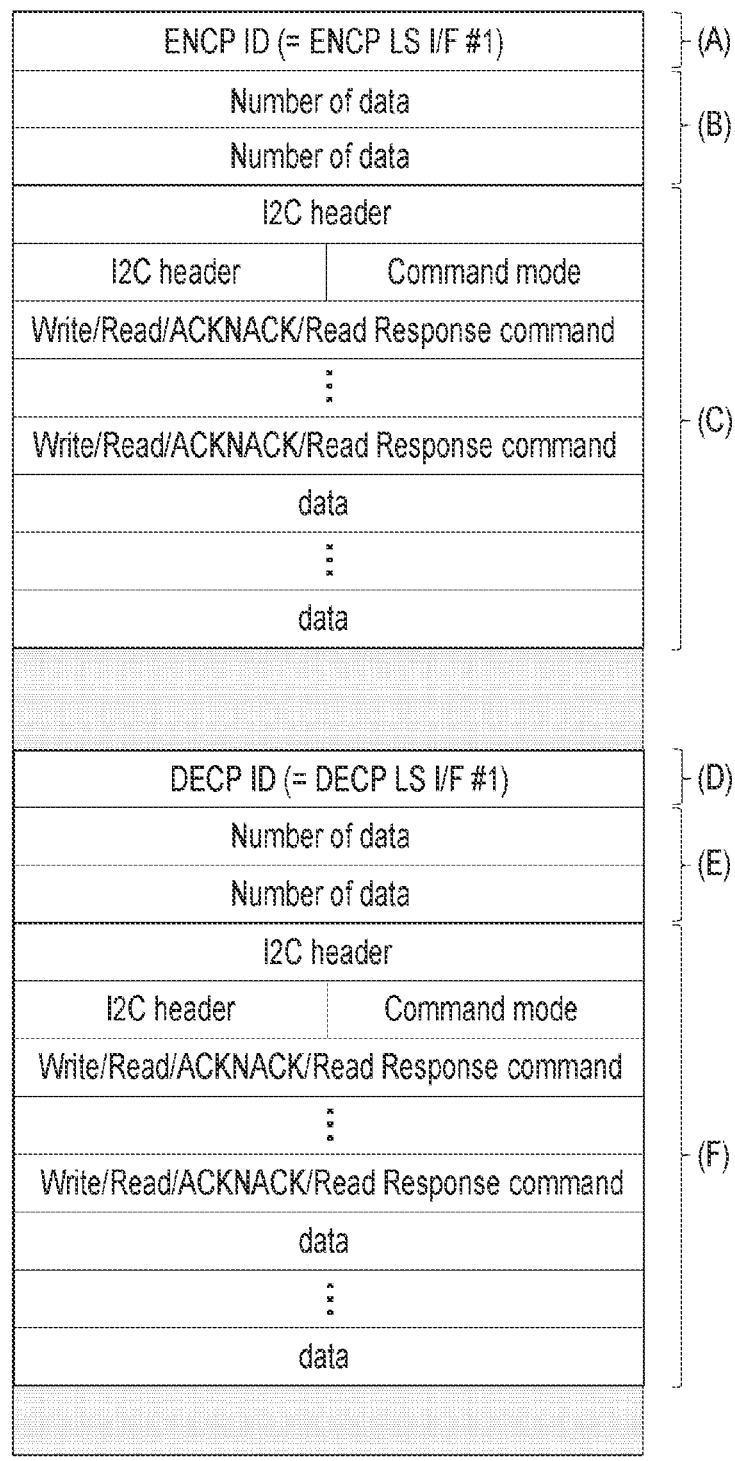
FIG. 9 is a data configuration diagram in a case of storing data in an I2C bulk mode format in a buffer memory.

FIGS. 7A and 7B are flowcharts illustrating a processing procedure performed in the communication system 1 of FIG. 6, FIG. 8 is a diagram illustrating a memory map configuration in a case of storing data with an I2C bulk mode format in the memory 10-2 in the ECU 10, and FIG. 9 is a data configuration diagram in a case of storing data in an I2C bulk mode format in the buffer memory 20-8 in the SerDes #1.

The ECU 10 first generates all the data to be written to the register 50-1 of the sensor 50 (step S1).

The ECU 10 then generates the I2C bulk mode format illustrated in FIG. 3 in the write command mode (I2C format type (000)). The ECU 10 generates data for storing a slave address of the sensor 50, an offset address indicating the write destination address of the register 50-1, and length information indicating the number of write data in their corresponding locations of the register 50-1. Furthermore, the heading data is stored in the data area of the I2C bulk mode format (step S2).

The ECU 10 stores the ENCP ID of SerDes #1 20 (the portion (A) of FIG. 8) that transmits the I2C bulk mode format, the number of data in the entire I2C bulk mode format (the portion (B) of FIG. 8), and the I2C bulk mode format generated in step S2 (the portion (C) of FIG. 8) in the memory 10-2 (step S3). In FIG. 8, the address of the memory 10-2 is illustrated for convenience and can be optionally selected.

The ECU 10 instructs the HS I/F 10-6 in the SerDes #1 20 to transfer data from 0x0100 to 0x01XX on the memory 10-2 (step S4). The HS I/F 10-6 picks out the data from 0x0100 to 0x01XX from the memory 10-2 and outputs them sequentially in accordance with the HS I/F protocol (step S5). The HS I/F 20-7 of the SerDes #1 20 sequentially receives the data from the HS I/F 10-6 and stores them in the buffer memory 20-8 (step S6).

As can be seen by comparing FIGS. 8 and 9, the buffer memory 20-8 in the SerDes #1 stores data having the same data configuration as the memory 10-2 in the ECU 10. Next, in the SerDes #1 20, the decoder 20-9 reads out the data from the buffer memory 20-8 (step S7). In this event, the decoder 20-9 interprets the ENCP ID (the portion (A) of FIG. 8) described at the beginning of the I2C bulk mode format, recognizes that "ENCP ID=ENCP LS I/F #1", and outputs the data to the ENCP LS I/F #1 20-2. Although not illustrated, in a case where multiple ENCPs exist as well, the data output destination is selected using the ENCP ID of the I2C bulk mode format.

The decoder 20-9 reads out the number of data indicated by "number of data" (the portion (B) of FIG. 8) from the buffer memory 20-8 and outputs it to the ENCP LS I/F #1 20-2. The operations described above enable the data necessary for the I2C bulk mode to be transferred to the ENCP LS I/F #1.

The ENCP LS I/F #1 20-2 stores the received I2C bulk mode format (the portion (C) of FIG. 8) in the packet payload of the packet format (FIG. 5B), generates a packet format (FIG. 5B) with a packet header indicating the packet type or the like, and outputs it to the DLL 20-4 (step S8).

The operation procedure from the reception of the packet format (FIG. 5B) by the DLL 20-4 to the writing of data to the register 50-1 of the sensor 50 is the same as the general ASA serial communication (step S9).

Furthermore, the ACK/NACK response during I2C communication of the sensor 50 is performed in the LS I/F #1 40-1, the ENCP LS I/F #1 40-2, the DLL 40-4, the PHY 40-5 of the SerDes #2 40, and the PHY format illustrated in FIG. 5D is output over the downlink (step S10).

The PHY 20-5, the DLL 20-4, and the DECP LS I/F #1 20-3 of the SerDes #1 20 receive the PHY format (FIG. 5D) given from the SerDes #2 and acquire the I2C bulk mode format (FIG. 5A) that is the ACK/NACK format (step S11), which is similar to the general ASA serial communication. The encoder 20-10 acquires the I2C bulk mode format (FIG. 5A) from the DECP LS I/F #1 20-3, generates a DECP ID (in this example, the DECP LS I/F #1 20-3 (the portion (D) of FIG. 9) and the number of data (the portion (E) of FIG. 9) in the I2C bulk mode format (FIG. 5A), and outputs them to a pre-allocated memory area of the buffer memory 20-8 together with the I2C bulk mode format (the portion (F) of FIG. 9) (FIG. 9, step S12).

The ECU 10 measures a predetermined time with a watchdog timer or the like, and if an appropriate time elapses, The ECU 10 instructs the HS I/F 10-6 to read out the I2C bulk mode (the portion (F) of FIG. 9), which is the ACK/NACK format and is the result of the I2C writing, via the HS I/F 20-7 from the buffer memory 20-8 of the SerDes #1 20 (step S13).

The HS IF 10-6 reads out the DECP ID (the portion (D) of FIG. 9), the number of data (the portion (E) of FIG. 9), and the I2C bulk mode (the portion (F) of FIG. 9) from the buffer memory 20-8 via the HS IF 20-7. The HS IF 10-6 writes the read data to a predetermined area of the memory 10-2 (the portions (D), (E), and (F) of FIG. 8, step S14).

The ECU 10 confirms that the data has been sent back from the desired DECP using the DECP ID (the portion (D) of FIG. 8) and the number of data (the portion (E) of FIG. 8) on the memory 10-2. The ECU 10 acquires an ACK/NACK result stored in the data area (the portion (F) of FIG. 8), confirms that the control data has been transferred to the register 50-1 of the sensor 50, and ends the control data transmission operation (step S15).

Moreover, the description is given of the example in which the ECU 10 initiates the read operation to the buffer memory 20-8 using the watchdog timer in step S13. However, at the time of completion of the preparation of the data read into the buffer memory 20-8 (the portions (D), (E), and (F) of FIG. 9), the SerDes #1 20 transmits an interrupt signal to the ECU 10. The ECU 10 can initiate the read operation to the buffer memory 20-8 using the reception of this interrupt signal as a trigger.

Further, an embodiment of the present disclosure provides the storage of the I2C bulk mode format in the memory 10-2 for the transmission thereof, but other formats (e.g., GPIO) stored in the packet payload of the packet format (FIG. 5B) can be employed using a similar procedure.

As described above, in the first embodiment, the ECU 10 stores the I2C bulk mode format data to be transmitted to the sensor 50 in the memory 10-2 and transmits the data in the memory 10-2 to the SerDes #1 via the HS I/F 10-6, which is the high-speed interface. In the SerDes #1, the ENCP LS I/F #1 20-2 generates an ASA-compliant packet including the received I2C bulk mode format data and transmits it to the SerDes #2 via the DLL 20-4 and the PHY 20-5. In the SerDes #2, the DECP LS I/F #1 40-3 picks out the I2C bulk mode format data from the received packet and transmits them to the sensor 50 via the LS I/F #1 40-1.

According to the first embodiment, the I2C bulk mode format data is transmitted at high speed between the ECU 10 and the SerDes #1 20, so even if the sensor 50 performs I2C communication, it is possible to transmit the control data from the ECU 10 to the sensor 50 at high speed.

Second Embodiment

A communication system 1 according to a second embodiment has the configuration that the sensor 50, which is the slave device 50, incorporates the SerDes #2 40.

The sensor 50 has the SerDes #2 40 built therein, so the ECU 10 is capable of setting the control data in the control register of the sensor 50 without through the low-speed interface, which is different from the normal I2C communication or the first embodiment. This means that the restriction on data transfer rate caused by I2C communication, which was a challenge occurring when the ECU 10 controls the sensor 50, can be eliminated.

Figure 10:
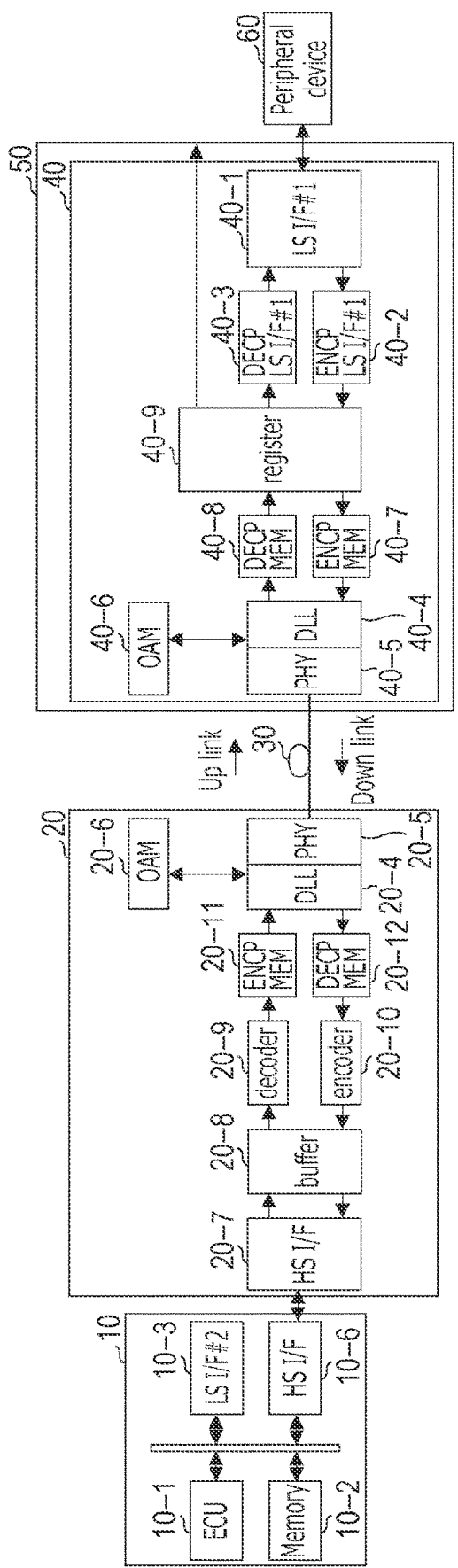
FIG. 10 is a block diagram illustrating a schematic configuration of a communication system provided with a communication device according to a second embodiment.

FIG. 10 is a block diagram illustrating a schematic configuration of the communication system 1 provided with a communication device according to the second embodiment. In FIG. 10, the same reference numerals are given to the components common to those illustrated in FIG. 6, and the differences are mainly described below. In FIG. 10, the communication system 1 includes an ECU 10, a SerDes #1 20, and a SerDes #2 40. The ECU 10 has the same configuration as FIG. 6, the SerDes #1 20 has a configuration different from that of FIG. 6, and the SerDes #2 40 has a configuration different from that of FIG. 6. The SerDes #2 40 is incorporated in the sensor 50. The sensor 50 can be connected to peripheral equipment 60, as illustrated in FIG. 10.

In FIG. 10, the SerDes #1 20 has an encapsulator ENCP MEM 20-11 and a de-encapsulator DECP MEM 20-12 instead of the ENCP LS I/F #1 20-2 and the DECP LS I/F #1 20-3, respectively, in the SerDes #1 20 of FIG. 6. The other components are the same as the SerDes #1 20 of FIG. 6. In FIG. 10, the SerDes #2 40 has the LS I/F #1 40-1, the ENCP LS I/F #1 40-2, the DECP LS I/F #1 40-3, the DLL 40-4, the PHY 40-5, and the OAM unit 40-6, which are similar to the SerDes #2 40 of FIG. 6. In addition, the SerDes #2 40 of FIG. 10 further has an ENCP MEM 40-7, a DECP MEM 40-8, and a register 40-9, which are not included in the SerDes #2 40 of FIG. 6.

The register 40-9 holds, for example, a setting value used for controlling the sensor 50. In addition, the register 40-9 store the I2C bulk mode format data to be transmitted to the peripheral equipment 60 connected via the LS I/F #1 40-1.

In the SerDes #1 20, the ENCP MEM 20-11 generates a packet used to transmit data directly from the ENC 10 to the register 40-9 in the SerDes #2 40. The DECP MEM 20-12 picks out the I2C bulk mode format data given from the sensor 50 from the downlink packet, which is transmitted from the SerDes #2 40 and received by the PHY 20-5 and the DLL 20-4.

In the SerDes #2 40 incorporated in the sensor 50, the DECP MEM 40-8 picks out the I2C bulk mode format data included in the packet given from the SerDes #1 20 and stores them in the register 40-9. The ENCP MEM 40-7 reads the data of the sensor 50 or the peripheral equipment 60 that are stored in the register 40-9, generates an ASA-compliant packet, and transmits it to the DLL 40-4.

The DECP LS I/F #1 40-3 picks out the I2C bulk mode format data given from the ECU 10, which are stored in the register 40-9, and transmits them to the peripheral equipment 60 via the LS I/F #1 40-1. The ENCP LS I/F #1 40-2 receives the data transmitted over the I2C communication from the peripheral equipment 60 via the LS I/F #1 40-1 and converts them into a packet.

Figure 11:
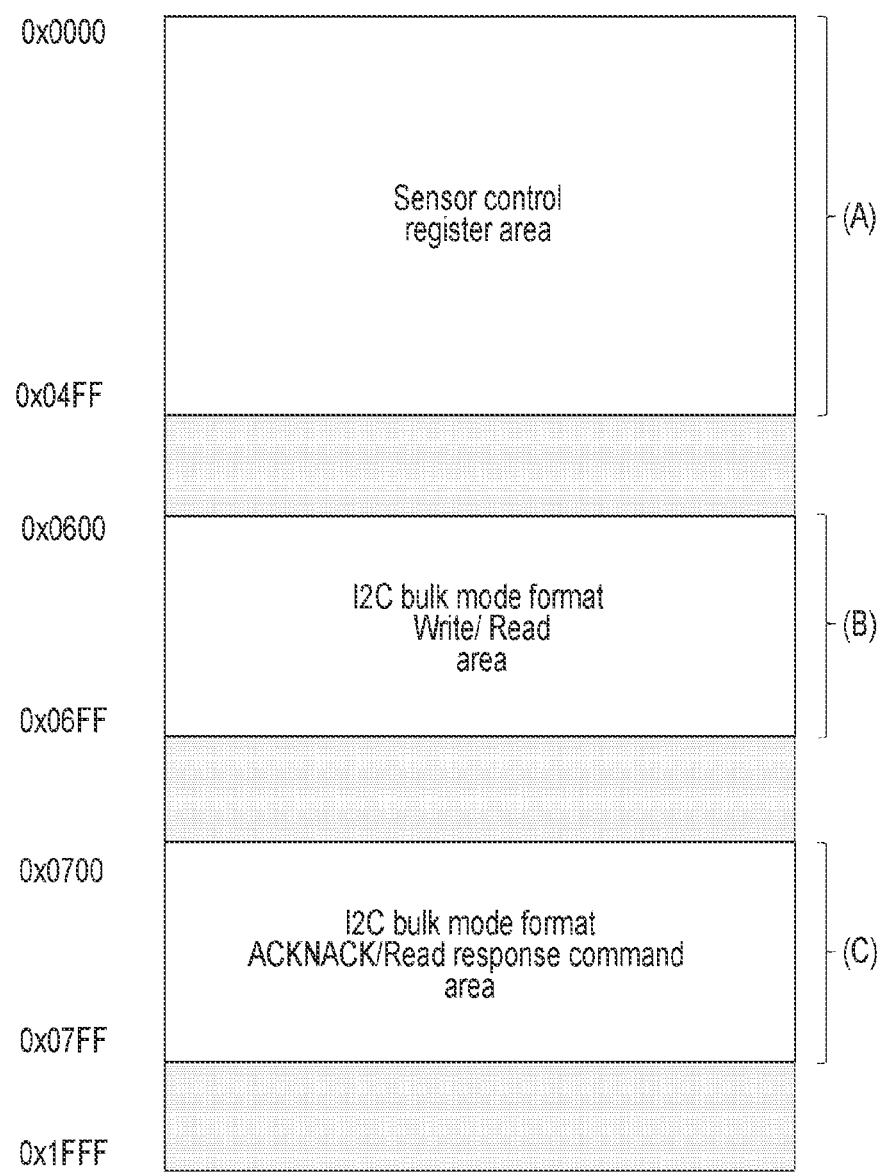
FIG. 11 is a diagram illustrating an example of address mapping for a register.

The description is now given of the operation of the communication system 1 illustrated in FIG. 10. The ECU 10 intends to recognize the address mapping of the register 40-9 of the sensor 50 in advance. FIG. 11 is a diagram illustrating an example of address mapping for the register 40-9.

As illustrated in FIG. 11, the register 40-9 has a sensor control register area (the portion (A) of FIG. 11), an I2C bulk mode format write/read area (the portion (B) of FIG. 11), and an I2C bulk mode format ACK/NACK or read-response command area (the portion (C) of FIG. 11). The sensor control register area in the portion (A) of FIG. 11 is an area used to store the register data for controlling the sensor 50. The I2C bulk mode format write/read area in the portion (B) of FIG. 11 is an area used to store the I2C bulk mode format data for controlling the peripheral equipment 60 connected to the sensor 50 through the I2C bus in the I2C bulk mode. The I2C bulk mode format is generated by the ECU 10. The ACK/NACK or read-response command area in the I2C bulk mode format illustrated in the portion (C) of FIG. 11 is an area used to store the ACK/NACK or read-response command in the I2C bulk mode format given from the peripheral equipment 60.

Figure 12:
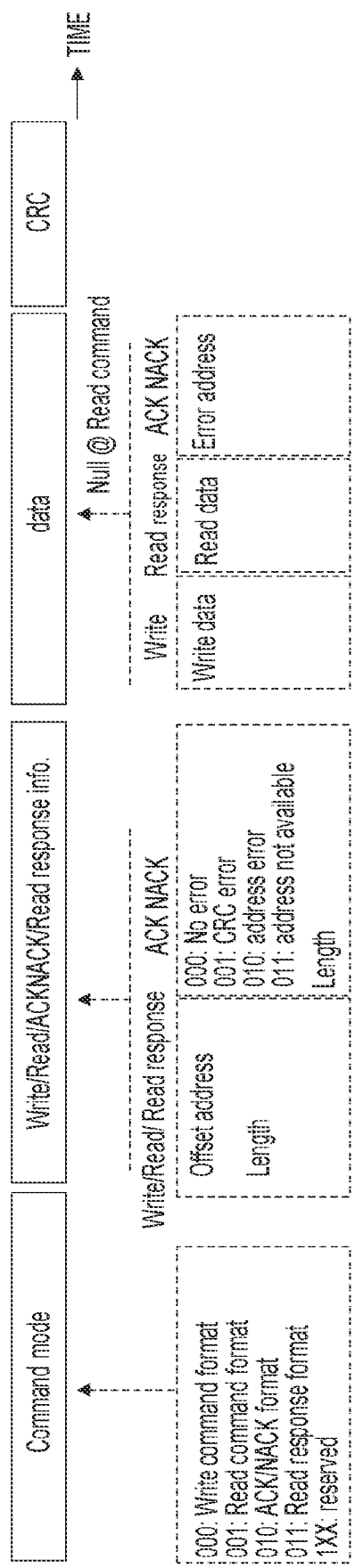
FIG. 12 is a diagram illustrating the configuration of data in a memory write/read command packet format transmitted from a SerDes #1.
Figure 13:
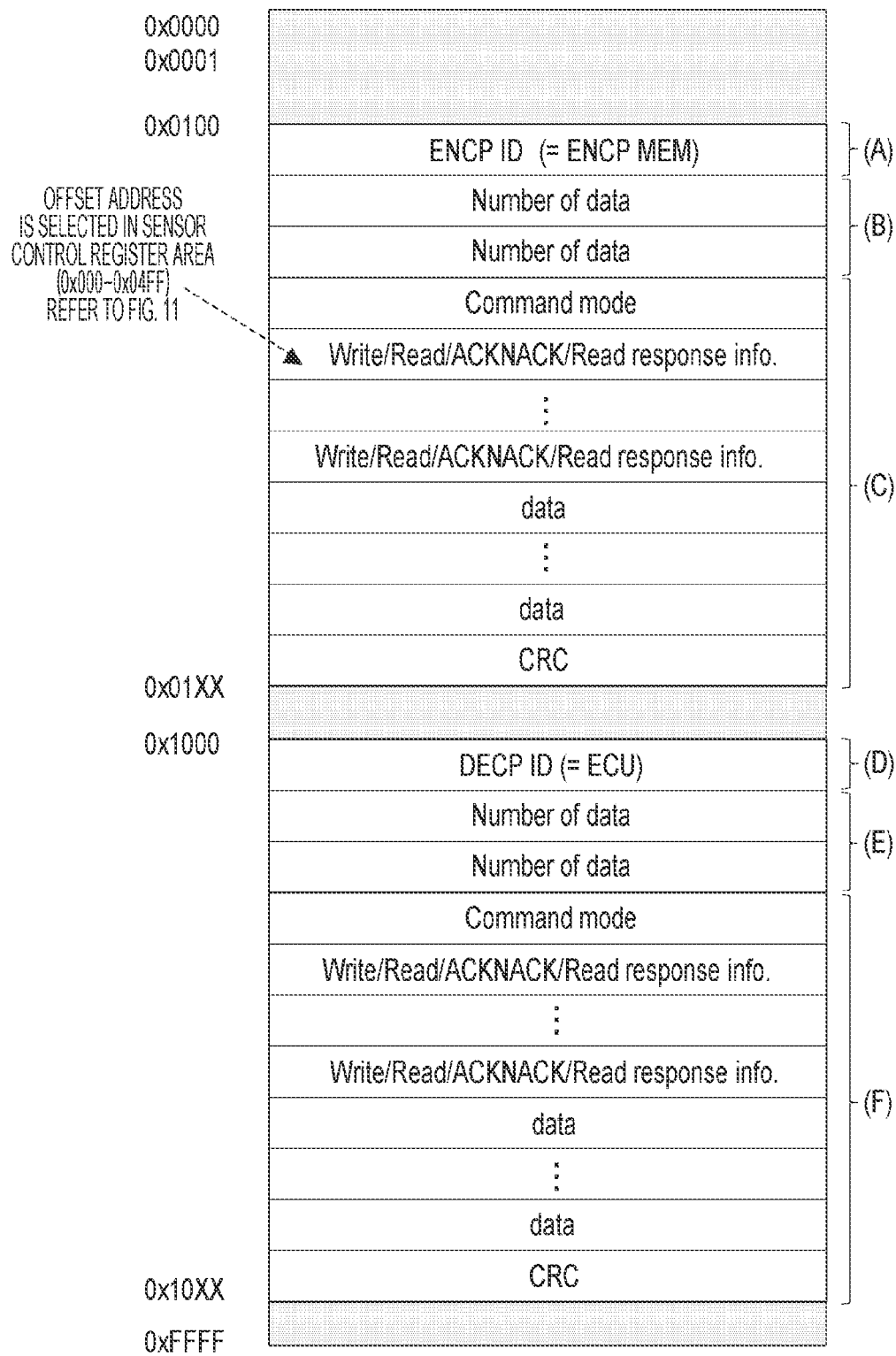
FIG. 13 is a diagram illustrating the configuration of data of a memory write/read command stored in a memory of an ECU.
Figure 14:
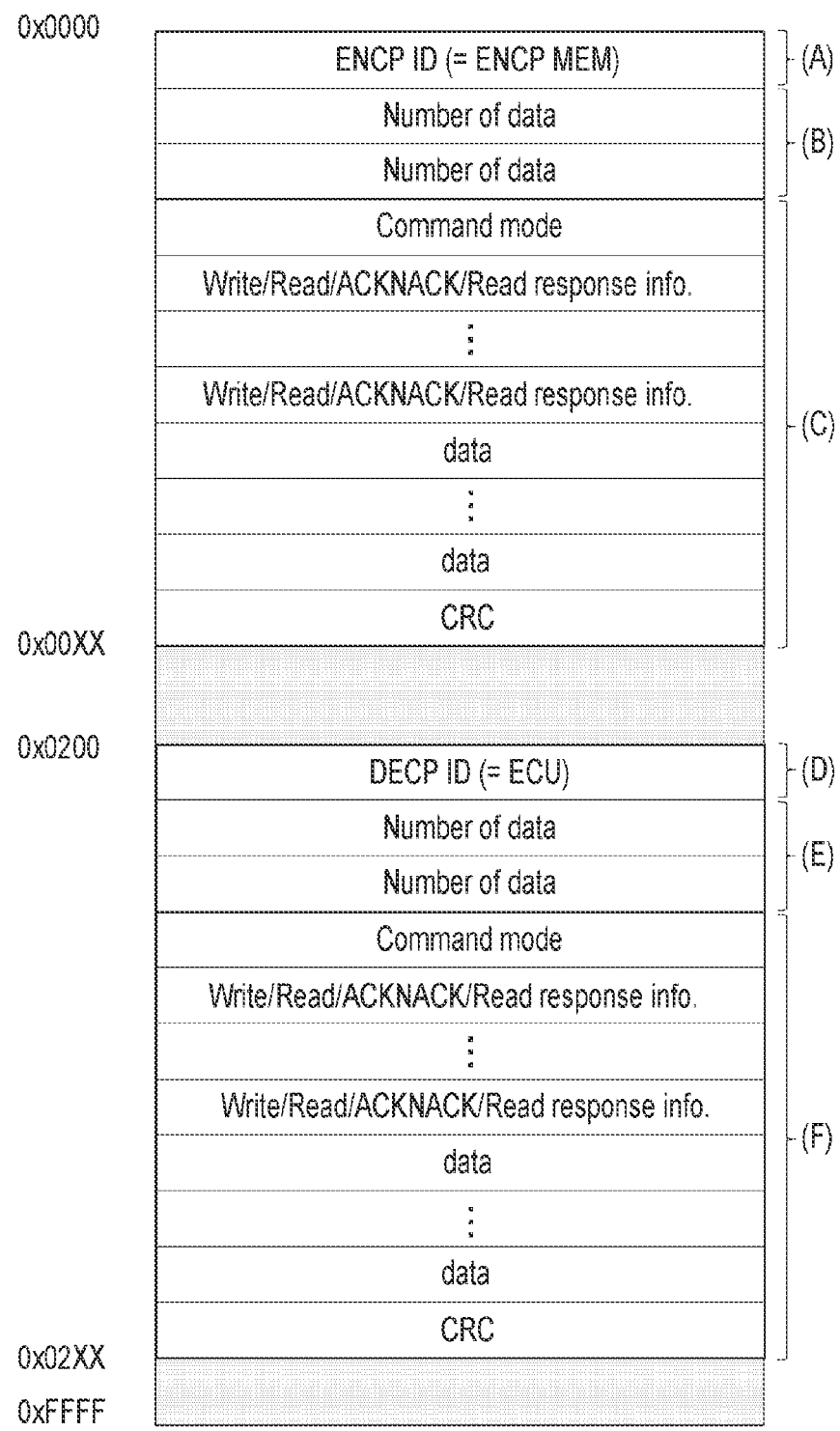
FIG. 14 is a diagram illustrating the configuration of data of a memory write/read command stored in a buffer memory of a SerDes #1.

FIG. 12 is a diagram illustrating the configuration of data in a memory write/read command packet format transmitted from the SerDes #1 20. FIG. 13 is a diagram illustrating the configuration of data of a memory write/read command stored in the memory 10-2 of the ECU 10. FIG. 14 is a diagram illustrating the configuration of data of a memory write/read command stored in the buffer memory 20-8 of the SerDes #1 20.

Figure 15A:
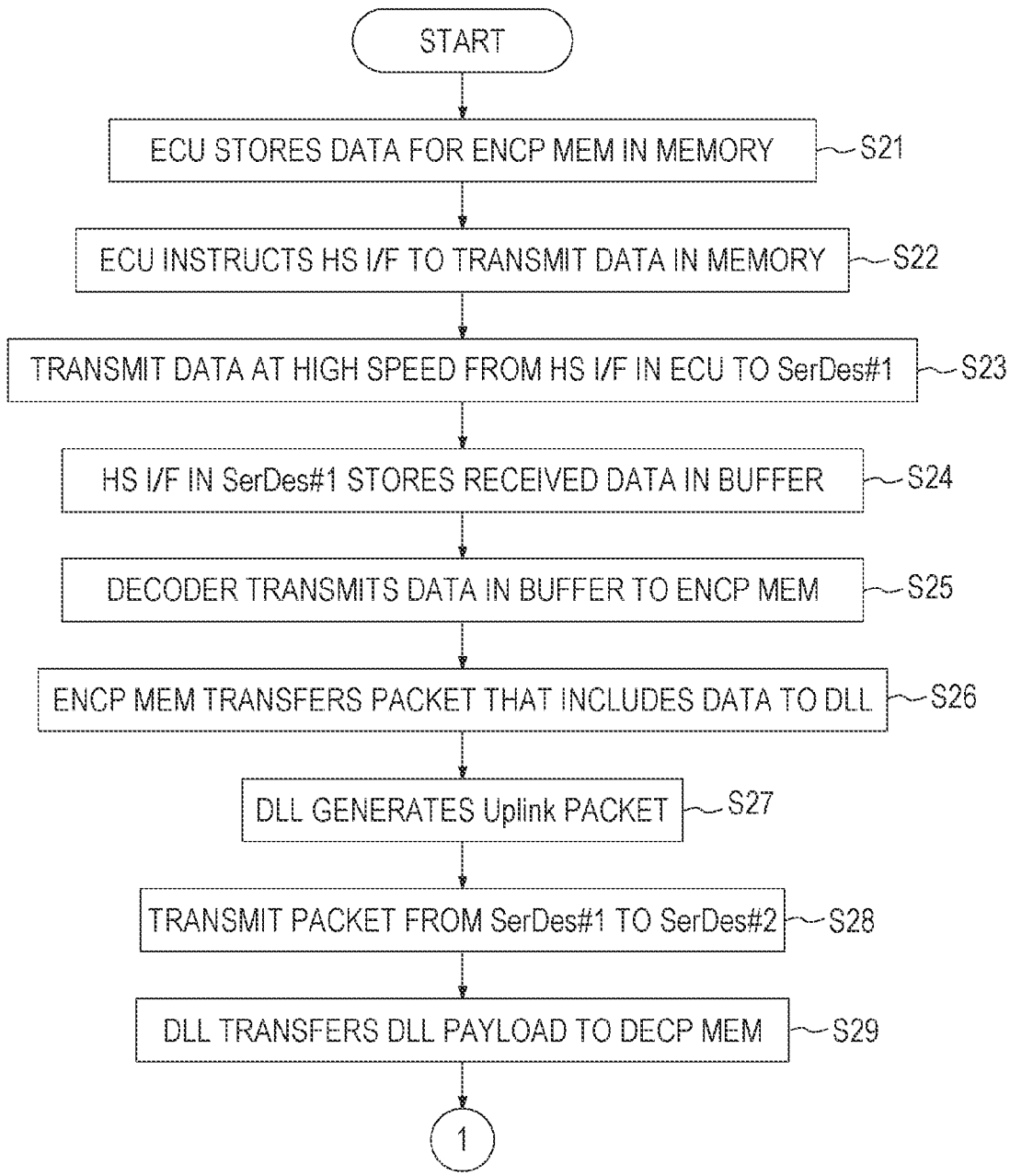
FIG. 15A is a flowchart illustrating a processing procedure performed by the communication system according to the second embodiment.
Figure 15B:
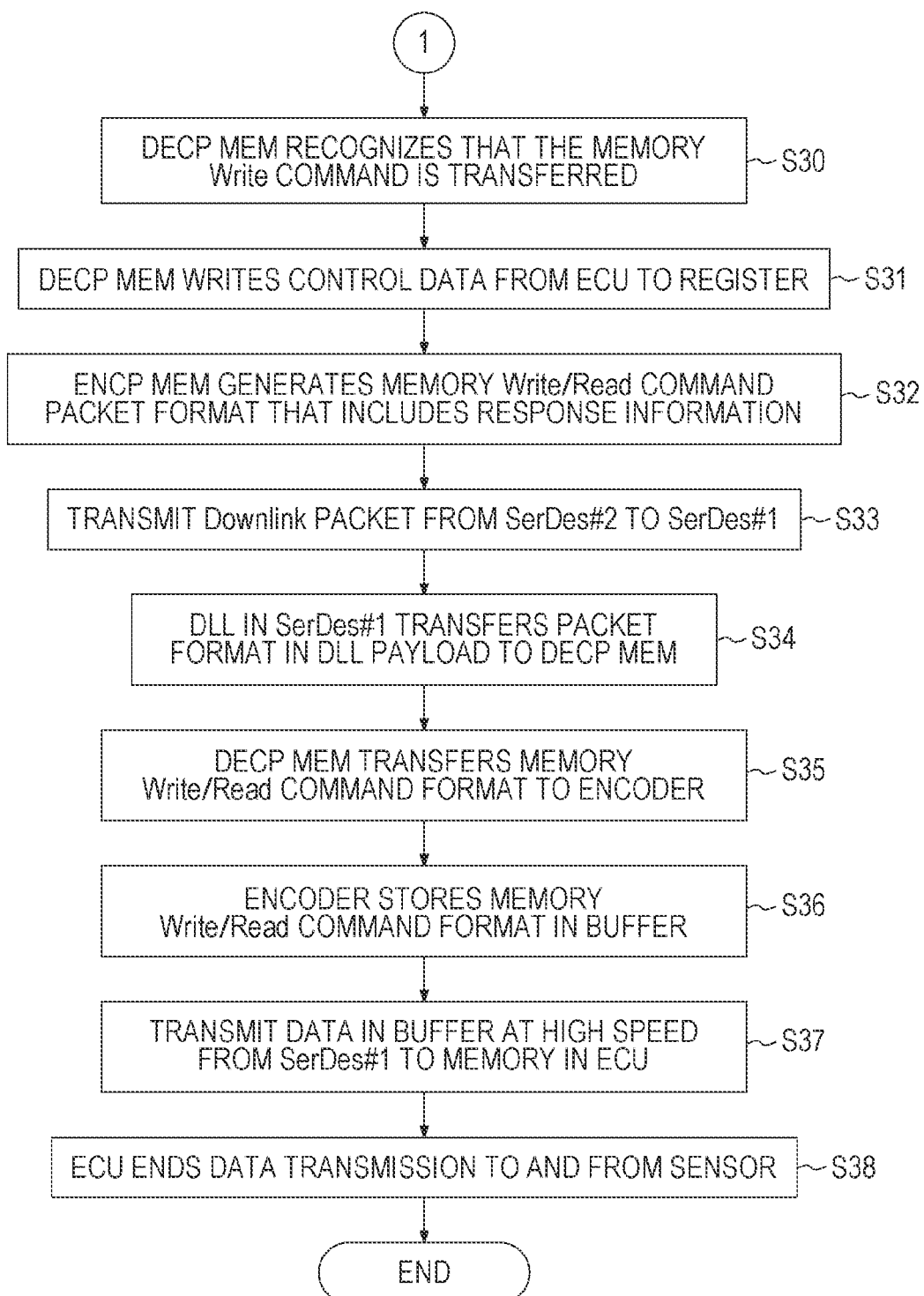
FIG. 15B is a flowchart illustrating a continuation of the flowchart of FIG. 15A.

FIGS. 15A and 15B are flowcharts illustrating a processing procedure performed by the communication system 1 according to the second embodiment. The ECU 10 first stores the data to be input to the ENCP MEM 20-11 in the memory 10-2 (FIG. 13, step S21). The memory 10-2 stores an ENCP ID (the portion (A) of FIG. 13), which is the identification information of the ENCP MEM 20-11, the number of data to be input to the ENCP MEM 20-11 (the portion (B) of FIG. 13), and a memory write/read command format (the portion (C) of FIG. 13) that includes data for writing in the sensor control register area (the portion (A) of FIG. 11) of the register 40-9 in the sensor 50.

The write destination address of the sensor control register area (the portion (A) of FIG. 11) of the register 40-9 in the sensor 50 is stored in the offset address area (FIG. 12) in the memory write/read command format (the portion (C) of FIG. 13) by the ECU 10.

The ECU 10 instructs the HS I/F 10-6 to transfer the data from 0x0100 to 0x01XX on the memory 10-2 (step S22). The HS I/F 10-6 picks out data from 0x0100 to 0x01XX from the memory 10-2 and outputs them to the SerDes #1 20 in sequence in accordance with the HS I/F protocol (step S23).

In the SerDes #1 20, the HS I/F 20-7 sequentially receives the data from the HS I/F 10-6 of the ECU 10 and stores them in the buffer memory 20-8 (FIG. 14, step S24).

The decoder 20-9 reads out data from the buffer memory 20-8 (step S25). In this event, the ENCP ID (the portion (A) of FIG. 14) described at the beginning is interpreted, and the data is output to the ENCP MEM 20-11 from the fact that ENCP ID=ENCP MEM. The decoder 20-9 reads out the number of data indicated by "number of data" (the portion (B) of FIG. 14) from the buffer memory 20-8 and outputs it to the ENCP MEM 20-11. The operation described above enables the data necessary for data writing to be transferred to the ENCP MEM 20-11.

The ENCP MEM 20-11 stores the received memory write/read command packet format (the portion (C) of FIG. 14) in the packet payload of FIG. 5B in a similar way to the general ASA serial communication, generates a packet format appended with a packet header indicating the packet type (FIG. 5B), and outputs it to the DLL 20-4 (step S26). The subsequent processing performed by the DLL 20-4 and the PHY 20-5 in the SerDes #1 20 is basically the same as the general ASA serial communication, but the DLL 20-4 stores the information regarding that a destination to output the packet format is the DECP MEM 40-8 in the container header (FIG. 5C) (step S27). The SerDes #1 20 transmits an ASA-compliant uplink packet to the SerDes #2 40.

In the SerDes #2 40 incorporated in the sensor 50, the processing performed by the PHY 40-5 and the DLL 40-4 is the same as the general ASA serial communication (step S28).

The DLL 40-4 interprets the container header of the link-layer container format (FIG. 5C) and recognizes that the data to be output to the DECP MEM 40-8 is stored in the DLL payload. Accordingly, the DLL 40-4 outputs the DLL payload (FIG. 5C) to the DECP MEM 40-8 (step S29). The DECP MEM 40-8 interprets the packet payload (FIG. 5B) and recognizes that the memory write command is transferred using the command mode (FIG. 12) in the memory write/read command format (step S30). Then, the DECP MEM 40-8 interprets the write/read or ACK/NACK or read-response information (FIG. 12) and recognizes the offset address and data length of the register. This configuration allows the DECP MEM 40-8 to recognize all the write data correctly.

The DECP MEM 40-8 writes data sequentially in the sensor control register area (the portion (A) of FIG. 11) of the register 40-9 using the address described in the offset address (step S31).

If the writing of all the data is completed without error, the ENCP MEM 40-7 selects the ACK/NACK format and generates the memory write/read command packet format (FIG. 12) in which "no error" is stored in the ACK/NACK information, and generates a packet format appended with the packet header (FIG. 5B) (step S32).

The processing performed by the DLL 40-4 and the PHY 40-5 is the same as the general ASA serial communication, and finally, the PHY format (FIG. 5D) is output over the downlink (step S33).

In the SerDes #1 20, the processing performed by the PHY 20-5 and the DLL 20-4 is the same as the general ASA serial communication, but the DLL 20-4 interprets the container header and outputs the packet format in the DLL payload to the DECP MEM 20-12 (step S34).

The DECP MEM 20-12 picks out the memory write/read command packet format (FIG. 12) stored in the packet payload from the packet format and outputs it to the encoder 20-10 (step S35).

The encoder 20-10 generates a DECP ID (the ECU 10 in this example) (the portion (D) of FIG. 14) and the number of data (the portion (E) of FIG. 14) in the memory write/read command packet format (FIG. 12), and outputs them to the memory 10-2 area of the buffer memory 20-8 allocated in advance together with the memory write/read command packet format (the portion (F) of FIG. 14) (FIG. 14, step S36).

The subsequent processing is the same as step S13 and following steps of the first embodiment, and finally, the ECU 10 check that there is "no error" described in the ACK/NACK information of the memory write/read command packet format (the portion (F) of FIG. 13) stored in the memory 10-2. Accordingly, the ECU 10 confirms that the control data has been transferred to the register 40-9 of the sensor 50 and then ends the control data transfer operation (step S37).

Moreover, the data readout is performed by setting the command mode of the memory write/read command packet format (FIG. 12) to the read command and transmitting the data to the sensor 50. The data readout processing procedure is the same as that described above. In addition, the response procedure is performed by setting the command mode of the memory write/read command packet format (FIG. 12) to the read-response command and transmitting it to the SerDes #1 20. This processing procedure is also the same as that described above.

As described above, in the second embodiment, the SerDes #2 40 is incorporated in the sensor 50. The ECU 10 temporarily stores the control data for the sensor 50 in the memory 10-2 and then transmits the control data from the memory 10-2 to the register 40-9 of the SerDes #2 40 via the SerDes #1 20 and the SerDes #2 40. This configuration allows the ECU 10 to directly control the sensor 50. The signal is transmitted between the ECU 10 and the SerDes #1 20 using a high-speed interface, so it is possible to transmit the control data from the ECU 10 to the sensor 50 and to transmit the data acquired from the sensor 50 to the ECU 10 in a short time.

Third Embodiment

The second embodiment described above has the configuration that the ECU 10 is capable of directly writing and reading data to the register 40-9 of the sensor 50 in which the SerDes #2 40 is incorporated. On the other hand, in a third embodiment described below, the ECU 10 is capable of directly writing and reading data to the peripheral equipment 60 that performs I2C communication with the sensor 50 in which the SerDes #2 40 is incorporated.

A communication system 1 according to the third embodiment has a block configuration similar to that of FIG. 10. The peripheral equipment 60 has the I2C communication function. The ECU 10 transmits I2C bulk mode format data to the peripheral equipment 60. More specifically, the ECU 10 writes the control data of the I2C bulk mode format to the register 40-9 of the peripheral equipment 60 via the SerDes #1 20 and the sensor 50 in which the SerDes #2 40 is incorporated.

Figure 16:
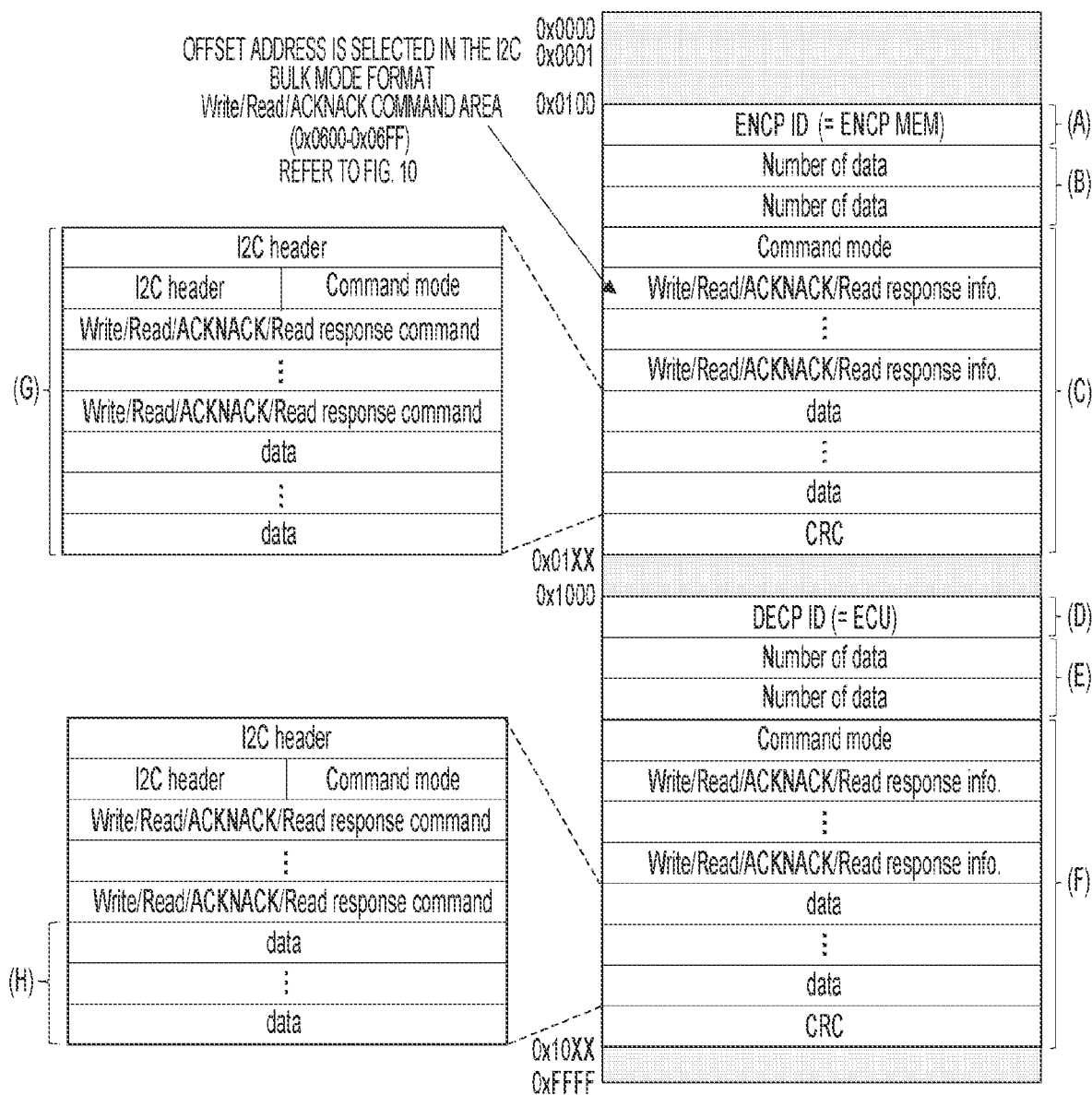
FIG. 16 is a diagram illustrating a memory map in a case of writing data in an I2C bulk mode format to a memory by an ECU according to a third embodiment.

FIG. 16 is a diagram illustrating a memory map in a case of writing data in an I2C bulk mode format to the memory 10-2 by the ECU 10 according to the third embodiment. The memory 10-2 includes an area for storing an ENCP ID, which is the identification information of the ENCP MEM 20-11 in the SerDes #1 20 (the portion (A) of FIG. 16), the number of data input to the ENCP MEM 20-11 (the portion (B) of FIG. 16), a memory write/read command format including data for writing to the sensor control register area (the portion (A) of FIG. 11) of the register 40-9 of the sensor 50 (the portion (C) of FIG. 16), an area for storing the ENCP ID, which is the identification information of the ECU 10 (the portion (D) of FIG. 16), the total number of data input to the ECU 10 (the portion (E) of FIG. 16), and an area for storing memory write/read response information including the data input to the ECU 10 (the portion (F) of FIG. 16). The data configuration of an I2C command format stored in the area illustrated in the portion (C) of FIG. 16 is illustrated in the portion (G) of FIG. 16, and the data configuration of the I2C command format stored in the area illustrated in the portion (F) of FIG. 16 is illustrated in the portion (H) of FIG. 16.

Figure 17A:
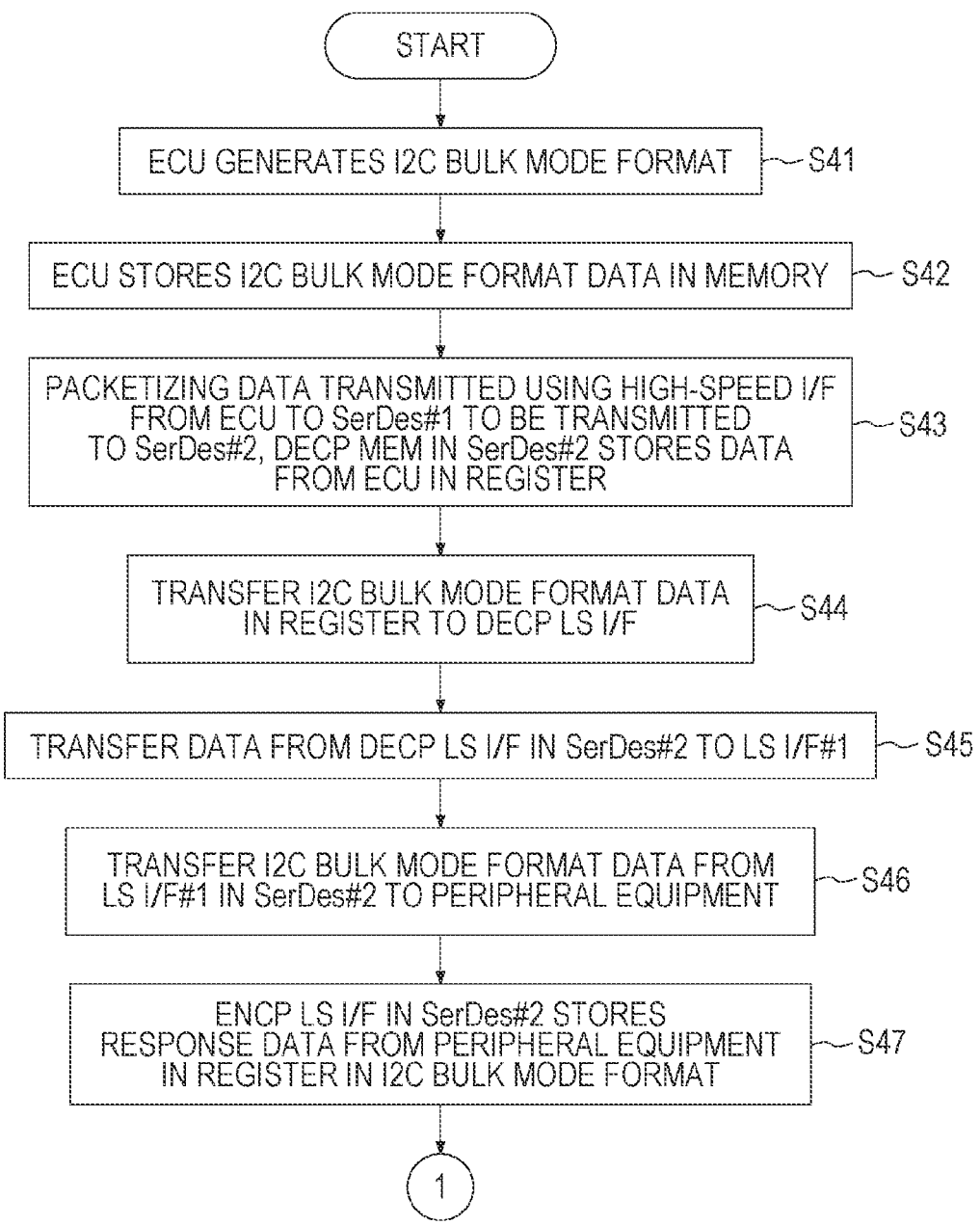
FIG. 17A is a flowchart illustrating a processing procedure performed by a communication system according to the third embodiment.
Figure 17B:
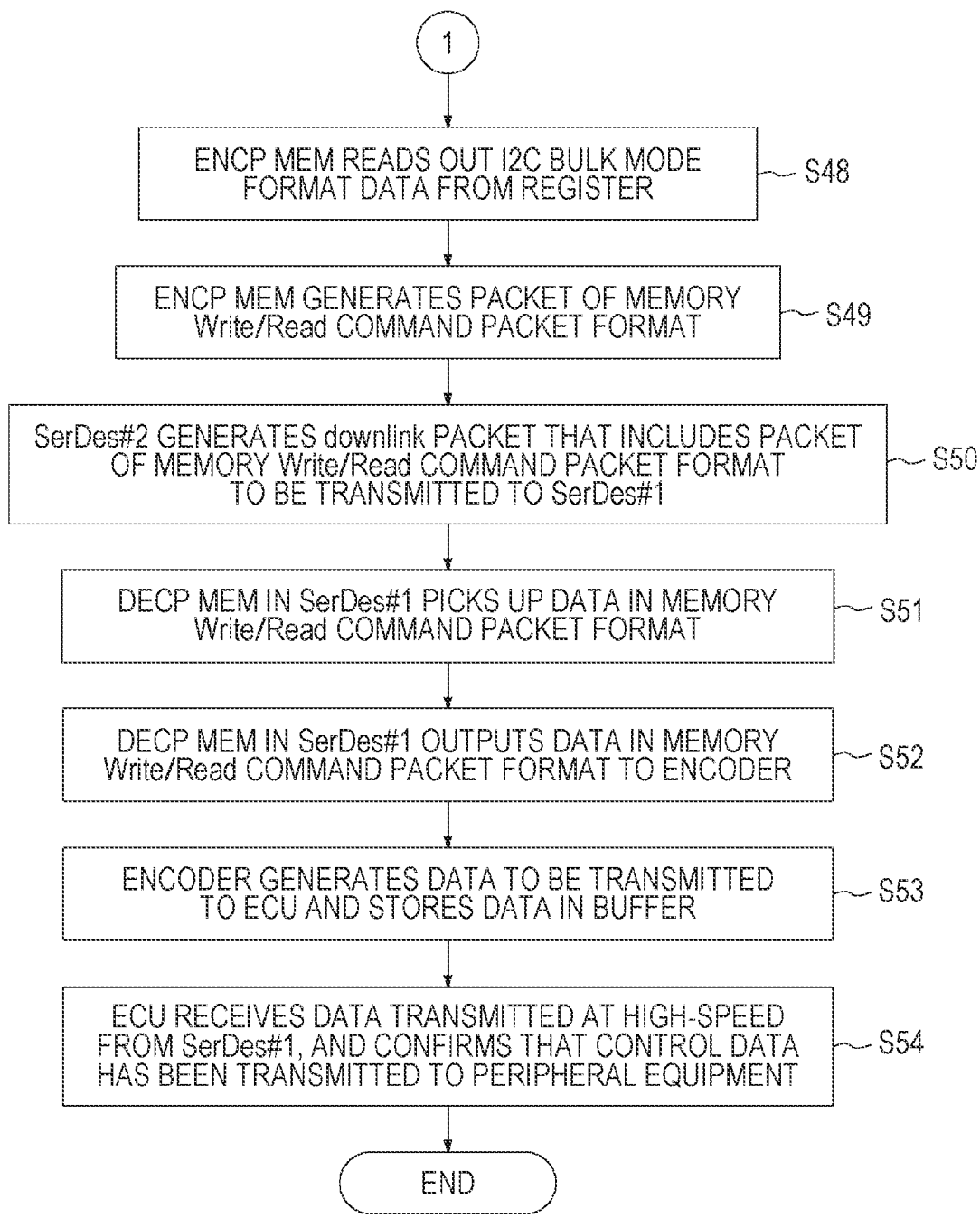
FIG. 17B is a flowchart illustrating a continuation of the flowchart of FIG. 17A.

FIGS. 17A and 17B are flowcharts illustrating a processing procedure performed by the communication system 1 according to the third embodiment. The ECU 10 first stores a slave address of the peripheral equipment 60 in a slave address of the write/read or ACK/NACK or read-response command of the I2C bulk mode format (FIG. 3), selects a write command format, stores a write destination address as an offset address, and generates an I2C bulk mode format used to store the control data in "data" (step S41).

The ECU 10 stores the I2C bulk mode format data for input to the ENCP MEM 20-11 in the memory 10-2 (FIG. 16, step S42). The ENCP MEM 20-11, which is the output destination, is stored in "ENCP ID" (the portion (A) of FIG. 16), and the number of data to be input to the ENCP MEM 20-11 is stored in "number of data" (the portion (B) of FIG. 16). In the memory area following the areas described above, the memory write/read command packet format (FIG. 12) for writing to the sensor control register area (the portion (B) of FIG. 11) of the register 40-9 of the sensor 50 is stored as the write command format. In this event, the previously generated I2C bulk mode format data is written to "write data" (the portion (G) of FIG. 16).

The subsequent writing procedure to the write/read or ACK/NACK or read-response command area of the I2C bulk mode format (the portion (B) of FIG. 11) of the register 40-9 of the sensor 50 is the same as that described in the second embodiment (step S43).

The register 40-9 to which the I2C bulk mode format data is written outputs the I2C bulk mode format to the DECP LS I/F 40-3 (step S44).

The method in which the DECP LS I/F 40-3 controls the LS I/F #1 40-1 using the I2C bulk mode format data to perform the I2C communication is the same as the normal I2C bulk mode communication (step S45).

The LS I/F #1 40-1 writes the control data of the I2C bulk mode format to the peripheral equipment 60 using the I2C communication (step S46). At the same time, the ENCP LS I/F #1 40-2 stores the ACK signal received as a response from the peripheral equipment 60 through the I2C communication. If the I2C communication is completed, the ENCP LS I/F #1 40-2 generates the I2C bulk mode format data used to set an I2C bulk mode ACK/NACK command (FIG. 3) and to store all ACK/NACK signals in the data. The ENCP LS I/F #1 40-2 writes it to the ACK/NACK or read-response command area of the I2C bulk mode format (the portion (C) of FIG. 11) of the register 40-9 (step S47).

The I2C bulk mode format data is output to the ENCP MEM 40-7 from the register 40-9 to which the I2C bulk mode format data of the ACK/NACK response command is written (step S48).

The ENCP MEM 40-7 sets a read-response format and generates a memory write/read command packet format (FIG. 12) used to store the I2C bulk mode format data of the ACK/NACK response command in the data area (step S49). The packet of the memory write/read command packet format is output over the downlink via the DLL 40-4 and the PHY 40-5 in a similar way to the procedure described above (step S50).

The packet of the memory write/read command packet format (the portion (B) of FIG. 8) received via the PHY 20-5 and the DLL 20-4 of the SerDes #1 20 is transferred to the DECP MEM 20-12 (step S51).

The memory write/read command packet format picked out from the payload by the DECP MEM 20-12 is transferred to the encoder 20-10 (step S52).

The encoder 20-10 generates a DECP ID (the ECU 10 in this example) (the portion (D) of FIG. 14), the memory write/read command packet format (FIG. 12), and the total number of data (the portion (E) of FIG. 14), and outputs them to the memory 10-2 area of the buffer memory 20-8 allocated in advance together with the memory write/read command packet format (the portion (F) of FIG. 14) (FIG. 14, step S53).

The subsequent processing is the same as step S13 and following steps of the first embodiment, and finally, the ECU 10 acquires the ACK/NACK result (the portion (H) of FIG. 16) of the I2C bulk mode format described in the data area of the memory write/read command packet format (the portion (F) of FIG. 16) stored in the memory 10-2. The ECU 10 confirms that the control data has been transmitted to the peripheral equipment 60 and ends the control data transmission operation (step S54).

As described above, in the third embodiment, in the case where the peripheral equipment 60 that performs I2C communication is connected to the sensor 50 in which the SerDes #2 40 is incorporated, the ECU 10 stores the control data of the I2C bulk mode format for the peripheral equipment 60 in the register 40-9 of the sensor 50. This configuration makes it possible for the ECU 10 to directly control the peripheral equipment 60.

Fourth Embodiment

A communication system 1 according to the fourth embodiment has the configuration that is applicable to both the case where the sensor 50 has the function of the SerDes #2 40 and the case where the sensor 50 does not have the function.

Figure 18:
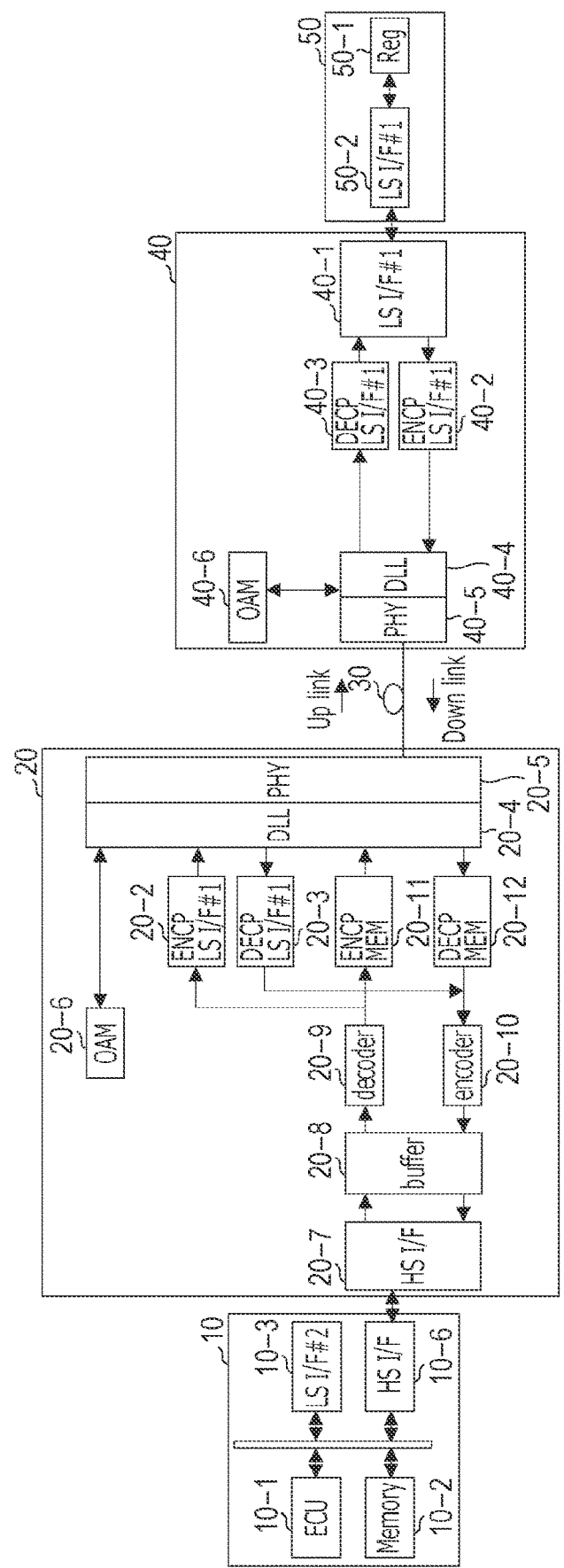
FIG. 18 is a block diagram illustrating a schematic configuration of a communication system provided with a communication device according to a fourth embodiment.

FIG. 18 is a block diagram illustrating a schematic configuration of the communication system 1 provided with a communication device according to the fourth embodiment. In FIG. 18, the communication system 1 includes an ECU 10 that is the master device 10, a SerDes #1 20 that is the master SerDes 20, a SerDes #2 40 that is the slave SerDes 40, and a sensor 50 that is the slave device 50. The internal configuration of the SerDes #1 20 is different from that of SerDes #1 20 according to the first to third embodiments.

In FIG. 18, the SerDes #1 20 has the ENCP LS I/F #1 20-2, the DECP LS I/F #1 20-3, the DLL 20-4, the PHY 20-5, the OAM unit 20-6, the HS I/F 20-7, the buffer memory 20-8, the decoder 20-9, and the encoder 20-10, which are similar to the SerDes #1 20 of FIG. 6. In addition, SerDes #1 20 of FIG. 18 includes the ENCP MEM 20-11 and the DECP MEM 20-12.

This configuration makes it possible to perform ASA-compliant high-speed serial communication in both the case of connecting the SerDes #2 40 having no register as illustrated in FIG. 6 or 18 and the case of connecting the SerDes #2 40 having the register 40-9 as illustrated in FIG. 10.

Additionally, the present technology may also be configured as below.

(1) A communication device including:
    a communication interface unit configured to receive control data from a master, the control data including data in a predetermined transmission format of a first protocol to be transmitted from a communication partner device to a slave;
    a storage unit configured to store the data of the first protocol received by the communication interface unit;
    an encapsulator configured to convert the data of the first protocol stored in the storage unit into data of a second protocol; and
    a communication unit configured to transmit the data of the second protocol converted by the encapsulator to the communication partner device.

(2) The communication device according to (1), in which the predetermined transmission format is a format for receiving an ACK signal or a NACK signal from the communication partner device after completing transmission of a plurality of bytes of data to the communication partner device.

(3) The communication device according to (2), in which the predetermined transmission format of the first protocol is an I2C bulk mode format specified by Automotive SerDes Alliance (ASA) standard ver1.01.

(4) The communication device according to (3), in which the storage unit stores the control data including identification information of the encapsulator, a number of data, and information regarding the I2C bulk mode format.

(5) The communication device according to any one of (1) to (4), in which the communication interface unit has a data transmission rate faster than a data transmission rate between the communication partner device and the slave.

(6) The communication device according to any one of (1) to (5), further including:
    a de-encapsulator configured to convert the data of the second protocol received by the communication unit from the communication partner device into the data of the first protocol and store converted data in the storage unit.

(7) A communication system including:
    a first communication device configured to perform data communication of a first protocol with a master; and a second communication device configured to perform data communication of a second protocol with the first communication device and perform the data communication of the first protocol with a slave, in which the first communication device has a first communication interface unit configured to receive control data from the master, the control data including data in a predetermined transmission format of the first protocol to be transmitted from the second communication device to the slave, a first storage unit configured to store the data of the first protocol received by the first communication interface unit, a first encapsulator configured to convert the data of the first protocol stored in the first storage unit into data of a second protocol, and a first communication unit configured to transmit the data of the second protocol converted by the first encapsulator to the second communication device.

(8) The communication system according to (7), further including:

a first de-encapsulator configured to convert the data of the second protocol transmitted from the second communication device and received by the first communication unit into the data of the first protocol and store converted data in the first storage unit.

(9) The communication system according to (7) or (8), in which the predetermined transmission format of the first protocol is an I2C bulk mode format specified by ASA standard ver1.01.

(10) The communication system according to any one of (7) to (9), in which the first communication interface unit has a data transmission rate faster than a data transmission rate between the second communication device and the slave.

(11) The communication system according to any one of (7) to (10), in which the second communication device has a second communication unit configured to receive the data of the second protocol transmitted from the first communication device, a second de-encapsulator configured to convert the data of the second protocol received by the second communication unit into the data of the first protocol, and a second communication interface unit configured to transmit the data of the first protocol converted by the second de-encapsulator to the slave.

(12) The communication system according to (11), in which the second communication device has a second encapsulator configured to convert the data of the first protocol transmitted from the slave and received by the second communication interface unit into the data of the second protocol, and the second communication unit transmits the data of the second protocol converted by the second encapsulator to the first communication device.

(13) The communication system according to any one of (7) to (12), in which the master has a second storage unit configured to store the control data including the data of the first protocol to be transmitted from the second communication device to the slave, and a third communication interface unit configured to transmit the control data stored in the second storage unit to the first communication device.

(14) The communication system according to any one of (7) to (13), further including:

an internal slave incorporated in the second communication device and configured to be directly controlled by the master, in which the second communication device has a third storage unit configured to store data for the master to directly control the internal slave.

(15) The communication system according to (14), in which the third storage unit stores the data of the first protocol to be transmitted to the slave.

(16) The communication system according to (14) or (15), in which the first communication device has a third encapsulator configured to convert the data given from the master and stored in the first storage unit into the data of the second protocol, and a third de-encapsulator configured to convert a protocol of data of the internal slave that is received by the first communication unit and read out from the third storage unit, and the second communication device stores data output from the third encapsulator in the third storage unit.

(17) A communication method including:

receiving, by a communication interface unit, control data from a master, the control data including data in a predetermined transmission format of a first protocol to be transmitted from a communication partner device to a slave;

storing the data of the first protocol received by the communication interface unit in a storage unit;

converting the data of the first protocol stored in the storage unit into data of a second protocol; and transmitting the converted data of the second protocol to the communication partner device.

The mode for carrying out the present disclosure is not limited to the respective embodiments described above but also includes various modifications that can be conceived by those skilled in the art, and the effects of the embodiments of the present disclosure are not limited to the description above. In other words, various additions, changes, and partial deletions are possible without departing from the conceptual idea and intention of the present disclosure derived from the scope of the claims or the equivalents thereof.

REFERENCE SIGNS LIST

1 Communication system
10 ECU
10-1 ECU core
10-2 Memory
10-3 Second low-speed interface unit (LS I/F #2)
10-4 First low-speed interface unit (LS I/F #1)
20 SerDes #1
20-1 Low-speed interface unit (LS I/F #1)
20-2 Encapsulator (ENCP LS I/F #1)
20-3 De-encapsulator (DECP LS I/F #2)
20-8 Buffer memory
20-9 Decoder
20-10 Encoder (ENCP MEM)
20-11 Encapsulator (ENCP LS I/F #1)
20-12 De-encapsulator (DECP MEM)
30 Cable
SerDes #2
40-1 Low-speed interface unit (LS I/F #1)
40-2 Encapsulator (ENCP LS I/F #2)
40-3 De-encapsulator (DECP LS I/F #1)
40-6 OAM unit
40-7 ENCP MEM
40-8 DECP MEM
40-9 Register 50 Slave device
50 Sensor
50 Image sensor
50-1 Register
50-2 Low-speed interface unit (LS I/F #1)
50 Peripheral equipment

The invention claimed is:

1. A serializer/deserializer ("SerDes") communication device comprising:
   a communication interface configured to receive control data from a master device, the control data including first data in an I2C bulk mode format of a first protocol to be transmitted from a communication partner SerDes device to a slave image sensor;
   a memory configured to store the first data received by the communication interface;
   an encapsulator configured to convert the first data stored in the memory into second data of a second protocol different from the first protocol;
   and a controller configured to transmit the second data converted by the encapsulator to the communication partner SerDes device,
   wherein the communication partner SerDes device converts the second data into third data in an I2C byte mode format of the first protocol, and transmits the third data to the slave image sensor.

2. The SerDes communication device according to claim 1, wherein
   the I2C bulk mode format is a format for receiving an ACK signal or a NACK signal from the communication partner device after completing transmission of a plurality of bytes of data to the communication partner device.

3. The SerDes communication device according to claim 2, wherein
   the I2C bulk mode format is specified by Automotive SerDes Alliance (ASA).

4. The communication SerDes device according to claim 3, wherein
   the memory stores the control data including identification information of the encapsulator, a number of data, and information regarding the I2C bulk mode format.

5. The SerDes communication device according to claim 1, wherein
   the communication interface has a data transmission rate faster than a data transmission rate between the communication partner device and the slave image sensor.

6. The SerDes communication device according to claim 1, further comprising:
   a de-encapsulator configured to convert the data of the second protocol received by the controller from the communication partner device into the second data of the first protocol and store second data in the storage unit.

7. A communication system comprising:
   a first serializer/deserializer ("SerDes") communication device configured to perform data communication of a first protocol with a master device; and
   a second SerDes communication device configured to perform data communication of a second protocol with the first SerDes communication device and perform the data communication of the first protocol with a slave device,
   wherein the first SerDes communication device includes
      a first communication interface configured to receive control data from the master device, the control data including first data in an I2C bulk mode format of the first protocol to be transmitted from the second SerDes communication device to the slave,
      a first memory configured to store the first data of the first protocol received by the first communication interface unit,
      a first encapsulator configured to convert the first data of the first protocol stored in the first storage unit into second data of a second protocol different from the first protocol, and
      a first controller configured to transmit the second data of the second protocol converted by the first encapsulator to the second SerDes communication device,
   wherein the second SerDes communication device includes
      a second communication interface configured to receive the second data from the first SerDes device,
      a first de-encapsulator configured to convert the second data into third data in an I2C byte mode format of the first protocol, and
      a second controller configured to transmit the third data to the slave device.

8. The communication system according to claim 7, wherein the first SerDes device further includes
   a second de-encapsulator configured to convert fourth data of the second protocol transmitted from the second SerDes communication device and received by the first controller into fifth data of the first protocol and store converted fifth data in the first memory.

9. The communication system according to claim 7, wherein
   the I2C bulk mode format is specified by ASA standard ver1.01.

10. The communication system according to claim 7, wherein
   the first communication interface has a data transmission rate faster than a data transmission rate between the second SerDes communication device and the slave device.

11. The communication system according to claim 7, wherein
   the second SerDes communication device has a second encapsulator configured to convert fourth data of the first protocol transmitted from the slave and received by the second communication interface unit into fifth data of the second protocol, and
   the second controller transmits the fifth data of the second protocol converted by the second encapsulator to the first SerDes communication device.

12. The communication system according to claim 7, wherein
   the master device has a second memory configured to store the control data including third data of the first protocol to be transmitted from the second SerDes communication device to the slave, and
   a third communication interface configured to transmit the control data stored in the second memory to the first SerDes communication device.

13. The communication system according to claim 7, further comprising:
   an internal slave incorporated in the second SerDes communication device and configured to be directly controlled by the master device, wherein
   the second SerDes communication device has a third memory configured to store data for the master device to directly control the internal slave.

14. The communication system according to claim 13, wherein the third memory stores the third data of the first protocol to be transmitted to the slave.

15. The communication system according to claim 13, wherein
the first SerDes communication device has
a third encapsulator configured to convert the data given from the master device and stored in the first storage unit into the second data of the second protocol, and
a third de-encapsulator configured to convert a protocol of data of the internal slave that is received by the first communication unit and read out from the third memory, and
the second SerDes communication device stores data output from the third encapsulator in the third memory.

16. A communication method comprising:
receiving, by a communication interface of a first serializer/deserializer ("SerDes") communication device, control data from a master, the control data including first data in an I2C bulk mode format of a first protocol to be transmitted from a communication partner SerDes device to a slave;

storing, with the first SerDes communication device, the first data of the first protocol received by the communication interface unit in a memory;

converting, with an encapsulator of the first SerDes communication device, the first data of the first protocol stored in the memory into second data of a second protocol; and transmitting, with a controller of the first SerDes communication device, the second data to the communication partner SerDes device;

receiving, with the communication partner SerDes device, the second data from the first SerDes communication device, converting, with a de-encapsulator of the communication partner SerDes device, the second data into third data in an I2C byte mode format of the first protocol, and transmitting, with a controller of the communication partner SerDes device, the third data to the slave device.

* * * * *